United States Patent
Shyu et al.

(10) Patent No.: US 11,055,351 B1
(45) Date of Patent: Jul. 6, 2021

(54) FREQUENT PATTERN MINING ON A FREQUENT HIERARCHICAL PATTERN TREE

(71) Applicant: The Curators of the University of Missouri, Columbia, MO (US)

(72) Inventors: Chi-Ren Shyu, Columbia, MO (US); Michael Phinney, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 574 days.

(21) Appl. No.: 15/955,462

(22) Filed: Apr. 17, 2018

Related U.S. Application Data

(60) Provisional application No. 62/486,119, filed on Apr. 17, 2017.

(51) Int. Cl.
*G06F 16/00* (2019.01)
*G06F 16/901* (2019.01)
(Continued)

(52) U.S. Cl.
CPC ...... *G06F 16/9027* (2019.01); *G06F 16/2246* (2019.01); *G06F 16/2379* (2019.01);
(Continued)

(58) Field of Classification Search
CPC ............. G06F 16/2465; G06F 16/9027; G06F 16/2379; G06F 16/2246; G06F 16/285; G06F 2216/03
See application file for complete search history.

(56) References Cited

U.S. PATENT DOCUMENTS 6,665,669 B2   12/2003   Han et al.
7,433,879 B1   10/2008   Sharma et al.
(Continued)

FOREIGN PATENT DOCUMENTS

CN   104408127 A   3/2015

OTHER PUBLICATIONS

Agarwal et al., "A Tree Projection Algorithm for Generation of Frequent ItemSets", Journal of Parallel and Distributed Computing, Mar. 2001, pp. 1-23, vol. 61, Issue 3.
(Continued)

*Primary Examiner* — Diedra McQuitery
(74) *Attorney, Agent, or Firm* — Thompson Coburn LLP

(57) ABSTRACT

The present disclosure relates to a persistent data structure employed as a tree structure with a frequent pattern mining paradigm. The number of nodes in the tree structure scales linearly with respect to the number unique items within the itemsets associated with the nodes. With the disclosed pattern mining paradigm, compressed representations of maximal patterns may be mined with the goal of detecting a frequent maximal pattern covers in a top down approach. Thus, large patterns are detected before their subsets yielding a significant reduction in computation time. The persistent data structure is a dynamic data structure which may be updated to add or delete nodes or transactional information without the need for recreating the entire tree structure. Furthermore, the persistent data structure may be run by a computing system either locally or on a parallelized distributed computing architecture to increase operational performance.

12 Claims, 44 Drawing Sheets

(51) Int. Cl.
*G06F 16/2458* (2019.01)
*G06F 16/28* (2019.01)
*G06F 16/22* (2019.01)
*G06F 16/23* (2019.01)

(52) U.S. Cl.
CPC ........ *G06F 16/2465* (2019.01); *G06F 16/285* (2019.01); *G06F 2216/03* (2013.01)

(56) References Cited

U.S. PATENT DOCUMENTS

| | | | | |
|---|---|---|---|---|
| 7,469,246 | B1* | 12/2008 | Lamping | G06F 16/353 |
| 2007/0271287 | A1* | 11/2007 | Acharya | G06K 9/6219 |
| 2009/0259679 | A1* | 10/2009 | Thiesson | G06F 16/904 |
| 2010/0228604 | A1* | 9/2010 | Desai | G06Q 30/0202 |
| | | | | 705/7.31 |
| 2016/0253366 | A1* | 9/2016 | Hsu | G06K 9/00496 |
| | | | | 707/797 |
| 2018/0004816 | A1* | 1/2018 | Mozes | G06F 16/2465 |
| 2018/0203917 | A1* | 7/2018 | Marshall | G06F 16/285 |
| 2018/0268253 | A1* | 9/2018 | Hoffman | G06K 9/6218 |

OTHER PUBLICATIONS

Agrawal et al., "Mining Association Rules Between Sets of Items in Large Databases", ACM SIGMOD Record, Jun. 1993, pp. 207-216, vol. 22, Issue 2.

Agarwal et al., "Depth First Generation of Long Patterns", SIGKDD Explorations, Jun. 2000, pp. 108-118, vol. 2, Issue 1.

Aumann et al., "Borders: An Efficient Algorithm for Association Generation in Dynamic Databases", Journal of Intelligent Information Systems, 1999, pp. 61-73, vol. 12.

Bayardo, "Efficiently Mining Long Patterns from Databases", IBM Research Center, 1998, pp. 85-93.

Brossette et al., "Association Rules and Data Mining in Hospital Infection Control and Public Health Surveillance", Journal of the American Medical Informatics Association, Aug. 1998, vol. 5, Issue 4.

Burdick et al., "MAFIA: A Maximal Frequent Itemset Algorithm," IEEE Transactions on Knowledge and Data Engineering, Nov. 2005, pp. 1490-1504, vol. 17, Issue 11.

Cheung et al., "Incremental Mining of Frequent Patterns Without Candidate Generation or Support Constraint", IEEE Computer Society, 2003, 6 pages.

Chi et al., "Catch the Moment: Maintaining Closed Frequent Itemsets Over a Data Stream Sliding Window", Knowledge and Information Systems, 2006, pp. 265-294, vol. 10, Issue 3.

Han et al., "Mining Frequent Patterns Without Candidate Generation: A Frequent-Pattern Tree Approach", Data Mining and Knowledge Discovery, 2004, pp. 53-87, vol. 8.

Houtsma et al, "Set-Oriented Mining for Association Rules in Relational Database", IEEE, 1995, pp. 25-33.

Liu et al., "Mining Frequent Patterns from Very High Dimensional Data: A Top-Down Row Enumeration Approach", Society for Industrial and Applied Mathematics, 2006, pp. 280-291.

Nahar et al., "Association Rule Mining to Detect Factors Which Contribute to Heart Disease in Males and Females", Expert Systems with Applications, 2013, pp. 1086-1093, vol. 40.

Pramudiono et al., "FP-Tax: Tree Structure Based Generalized Association Rule Mining", ACM, 2004, pp. 60-63.

Silverstein et al., "Beyond Market Baskets: Generalizing Association Rules to Dependence Rules", Data Mining and Knowledge Discovery, 1998, pp. 39-68, vol. 2.

Szathmary, "Symbolic Data Mining Methods with the Coron Platform", Software Engineering, 2006, Universite Henri Poincare—Nancy 1.

Wright et al., "An Automated Technique for Identifying Associations Between Medications, Laboratory Results and Problems", Journal of Biomedical Informatics, 2010, pp. 891-901, vol. 43.

Xie et al., "Max-Clique: A Top-Down Graph-Based Approach to Frequent Pattern Mining", IEEE, 2010, pp. 1139-1144.

Yang, "The Complexity of Mining Maximal Frequent Itemsets and Maximal Frequent Patterns", ACM Digital Library, 2004, pp. 344-353.

Zaki et al., "CHARM: An Efficient Algorithm for Closed Itemset Mining", Society for Industrial and Applied Mathematics, 2002, pp. 457-473.

Zaki et al., "Fast Vertical Mining Using Diffsets", ACM, 2003, pp. 326-335.

\* cited by examiner

1: while current layer of tree $L_i$, $|L_i| > 1$ do
2:   for $a$ : from 0 until $|L_i|$ by 2 do
3:     Merge nodes $L_i(a)$ and $L_i(a+1)$ and add to $L_{i+1}$
4:   end for
5:   $i++$
6: end while

Figure 6

1: while current layer of tree $L_i$, $|L_i| > 1$ do
2:   for $a$ : node in $L_i$ do
3:     Find most similar $b \in L_i$, $a \neq b$
4:     Merge nodes $a$ and $b$
5:     Remove $a$ and $b$ from $L_i$
6:   end for
7:   $i++$
8: end while

Figure 7

1: *newNode* is required
2: function checkPair(*node*)
3:    $C$ = *node.children*, $C' = []$
4:    for $c \in C$ do
5:       if $Dist(newNode, c) < Dist(c, C - c)$ then
6:          $C' += c$
7:       end if
8:    end for
9:    if $C'$ is not empty then
10:       *minNode* = $c \in C'$ with minimum distance
11:       checkPair(*minNode*)
12:    else
13:       *Pair(node)*
14:       *UpdateAncestorTransactions(node)*
15:    end if
16: end function

Figure 10

```
1: function removeNode(node)
2:    if node.siblings.size == 1 then
3:       grandParent = node.parent.parent
4:       node.sibling.parent = grandParent
5:       delete(node.parent)
6:    end if
7:    UpdateAncestorTransactions(node.sibling)
8:    delete(node)
9: end function
```

Figure 12

```
1: function fhpg(A: Array of nodes in U)
2:     cT = ⋂_{a∈A} cT_a
3:     if cT.size < min_support then
4:         return
5:     end if
6:     leaves = {a | a ∈ A & a.children.size = 0}
7:     nonLeaves = A - leaves
8:     if nonLeaves.size > 0 then
9:         splitNode = nonLeaves.head
10:        rNodes = (nonLeaves - splitNode) + leaves
11:        fhpg(rNodes + splitNode.children)
12:        fhpg(rNodes + splitNode.rightChild)
13:        fhpg(rNodes + splitNode.leftChild)
14:    else
15:        save(A.itemset)
16:    end if
17: end function
```

Figure 13

```
11:    fhpg(rNodes + splitNode.children)
12:    if splitNode.rightChild not covered then
13:        fhpg(rNodes + splitNode.rightChild)
14:    end if
15:    if splitNode.leftChild not covered then
16:        fhpg(rNodes + splitNode.leftChild)
17:    end if
18: else
19:    saveMPPC(A.itemset)
20:    save(A.itemset)
21: end if
```

Figure 14

2: $cT = \bigcap_{a \in A} cT_a, xT = \bigcap_{a \in A} xT_a$
3: if $cT.size < min\_support$ then
4:    return
5: end if
6: if $xT.size >= min\_support$ then
7:    saveMPPC(A.itemset)
8:    save(A.itemset)
9:    return
10: end if
11: $leaves = \{a \mid a \in A \ \& \ a.children.size = 0\}$

Figure 15

```
1:  query = item(s)
2:  ancestors = ancestors of query
3:  function fhpg(A: Array of nodes in U)
4:    if A ∩ ancestors.size == 0 then
5:      return
6:    end if
7:    cT = ⋂_{a∈A} cT_a, xT = ⋂_{a∈A} xT_a
8:    if cT.size < min_support then
9:      return
10:   end if
11:   if xT.size >= min_support then
12:     saveMPPC(A.itemset)
13:     save(A.itemset)
14:     return
15:   end if
16:   leaves = {a | a ∈ A & a.children.size = 0}
17:   nonLeaves = A − leaves
18:   if nonLeaves.size > 0 then
19:     splitNode = nonLeaves.head
20:     rNodes = (nonLeaves − splitNode) + leaves
21:     fhpg(rNodes + splitNode.children)
22:     if splitNode.rightChild not covered then
23:       fhpg(rNodes + splitNode.rightChild)
24:     end if
25:     if splitNode.leftChild not covered then
26:       fhpg(rNodes + splitNode.leftChild)
27:     end if
28:   else
29:     saveMPPC(A.itemset)
30:     save(A.itemset)
31:   end if
32: end function
```

Figure 19

```
1: queries = []
2: for item ∈ I do
3:     n = newQuery()
4:     n.search = item
5:     queries.append(n)
6: end for
7: FHPTree.broadcastToNodes
8: for q ∈ Distribute(queries) do
9:     localFHPTree.search(q.search)
10: end for
```

Figure 31

```
 1: queries = []
 2: sortItems = I.sortByIncreasingSupport
 3: for item ∈ sortItems do
 4:     n = newQuery()
 5:     n.search = A.append(item)
 6:     n.previousItems = sortItems.subseq(0, item)
 7:     queries.append(n)
 8: end for
 9: FHPTree.broadcastToNodes
10: for q ∈ Distribute(queries) do
11:     localFHPTree.delete(q.previousNodes)
12:     localFHPTree.search(q.search)
13: end for
```

Figure 33

```
1: function Search(A: Array of items)
2:     queries = []
3:     sortItems = LsortByIncreasingSupportWith(A)
4:     for item ∈ sortItems do
5:         n = newQuery()
6:         n.search = A.append(item)
7:         n.previousItems = sortItems.subseq(o, item)
8:         queries.append(n)
9:     end for
10:    FHPTree.broadcastToNodes
11:    for q ∈ Distribute(queries) do
12:        localFHPTree.delete(q.previousNodes)
13:        localFHPTree.search(q.search)
14:    end for
15: end function
```

Figure 34

FREQUENT PATTERN MINING ON A FREQUENT HIERARCHICAL PATTERN TREE

CROSS-REFERENCE AND PRIORITY CLAIM TO RELATED APPLICATIONS

This patent application claims priority to U.S. provisional patent application 62/486,119, filed Apr. 17, 2017, and entitled "Frequent Hierarchical Pattern Tree", the entire disclosure of which is incorporated herein by reference.

STATEMENT REGARDING FEDERALLY SPONSORED RESEARCH OR DEVELOPMENT

This invention was made with government support under Grant No. P200A100053 awarded by the Department of Education and Grant No. CNS1429294 awarded by the National Science Foundation. The government has certain rights in the invention.

INTRODUCTION

Association rule mining (ARM) is a widely used, mature area of research in computer science and a key area of data mining large quantities of informational data. The concept originated as a part of a market basket analysis approach to consumer purchasing. The high-level task for markets was to identify cases where if a customer buys product $i_1$, $i_2$, and $i_3$, they will also buy product i with probability p. The general goal of ARM is to identify interesting patterns that exist in transaction datasets. These datasets could contain anything from a doctor's visits, trips to the grocery store, survey data, or positions on a chessboard, among others example datasets.

One example of an interesting dataset use is working with clinicians and a database containing electronic medical records (EMR). In this scenario, transactions could be individual patient visits, and on a national scale, EMRs reach the scale of big data that may contain hundreds of millions of records. Within each transaction (hospital visit), various information including demographics and vitals may be collected, such as age, gender, race, height, weight, temperature and blood pressure. In addition to those measurements, each transaction contains high-level information about patient health such as illness severity. Much of this information is dynamic as a patient health status will likely change. New drugs will receive FDA approval and begin to appear in the transaction database. Additionally, other drugs may fade out in favor of newer medications. As the International Classification of Disease (ICD) continues to evolve, codes used to annotate health conditions will also change. Classic association rule mining algorithms may need to completely reprocess data when these sort of changes to the transaction database occur. Persistent, dynamic data structures may be a highly advantageous piece of a scalable big data solution to these issues.

In population level studies at a big data scale, populations may be composed of various subgroups posing challenges as the interesting patterns they contain may be rare. For example, an oncologist may be interested in discovering patterns associated with pituitary tumors in adolescents, a relatively rare occurrence. Classic ARM approaches may require the enumeration of all patterns followed by a post-processing step to filter irrelevant information. The number of patterns may be exponential and impossible to enumerate. Therefore, efficient search that doesn't require the discovery of unrelated patterns is very helpful to handling big data.

In the above scenario, ARM may be used to identify patient attributes that correlate with specific outcomes. However, there are many challenges as the database not only grows, but also evolves dynamically. These include the merging of significant or interesting patterns of a rare occurrence, or low level support of new item types. In the medical domain, this sort of predictive power is invaluable. The predictive power may enable clinicians and physicians to implement preventive medical treatments to improve patient health before a traumatic event occurs. Although healthcare is described below as an example embodiment, ARM is a generic data mining method with analogous applications in a wide range of domains such as retail marketing, recommendation systems, fraud detection, census data, social network analysis, and any other domain that can be modeled as a collection of transactions.

One of the major challenges associated with ARM arises from the complexity of the a subproblem called Frequent Pattern Mining (FPM). An underlying goal of association rule mining algorithms is to efficiently solve the problem of frequent pattern mining. The most efficient algorithms can be generalized as Apriori-based or growth-based. The Apriori-based approaches all utilize a candidate generation step followed by a filtering step to remove candidates that do not satisfy the minimum support criteria. Growth-based approaches do not generate candidates; they construct a graph structure, and frequent patterns are identified by traversing the graph. Another interesting strategy is top-down pattern mining wherein large patterns are detected before their subsets.

Apriori-based and Growth-based approaches have evolved in similar ways. Both approaches have numerous extensions such as closed, maximal, high-utility, and sequential pattern mining in addition to handling streaming and uncertain datasets. Both approaches also have significant limitations. Apriori creates a lot of intermediate data. FPGrowth (Growth-based) addresses this problem, but creates another. In Growth-based mining, the size of the tree is highly dependent on the density of correlation between and distribution of items.

The inventors disclose a new computational data structure to address the shortcomings of these existing approaches. This new data structure, Frequent Hierarchical Pattern Tree (FHPTree), does not suffer from the large candidate generation issue associated with the Apriori algorithm, and the number of nodes in the tree structure is linearly dependent on the number of unique items in the database. In addition, this data structure enables users to discover frequent patterns in a top-down fashion, locating maximal item sets before any of their subsets. In contrast to existing top-down methods, the FHPTree allows a collection of items to be pruned simultaneously.

Further features and advantages of the disclosed embodiments, as well as the structure and operation of various elements of the disclosed embodiments, are described in detail below with reference to the accompanying drawings.

BRIEF DESCRIPTION OF THE DRAWINGS

FIG. 6 shows example pseudocode for this construction procedure of the tree structure for the persistent data structure in accordance with an embodiment of the disclosure.

FIG. 7 shows example pseudocode for tree correlation based construction of the persistent data structure in accordance with an embodiment of the disclosure.

FIG. 10 shows example pseudocode for the insert operation of the persistent data structure in accordance with an embodiment of the disclosure.

FIG. 12 shows example pseudocode for the delete operation of the persistent data structure in accordance with an embodiment of the disclosure.

FIG. 13 shows example pseudocode defining the transitioning mechanism of the persistent data structure in accordance with an embodiment of the disclosure.

FIG. 14 shows example pseudocode storing the maximal perfect pattern cover of the persistent data structure in accordance with an embodiment of the disclosure.

FIG. 15 shows an example pseudocode algorithm as an extension of the FIGS. 13 and 14 in accordance with an embodiment of the disclosure.

FIG. 19 shows an example pseudocode algorithm for the search operation of the persistent data structure in accordance with an embodiment of the disclosure.

FIG. 31 is example pseudocode for sequential search strategy on distributed architecture for the persistent data structure in accordance with an embodiment of the disclosure.

FIG. 33 is example pseudocode for a sequential search and delete strategy on distributed architecture for the persistent data structure in accordance with an embodiment of the disclosure.

FIG. 34 is example pseudocode for a search operation on distributed architecture for the persistent data structure in accordance with an embodiment of the disclosure.

Figure 1:
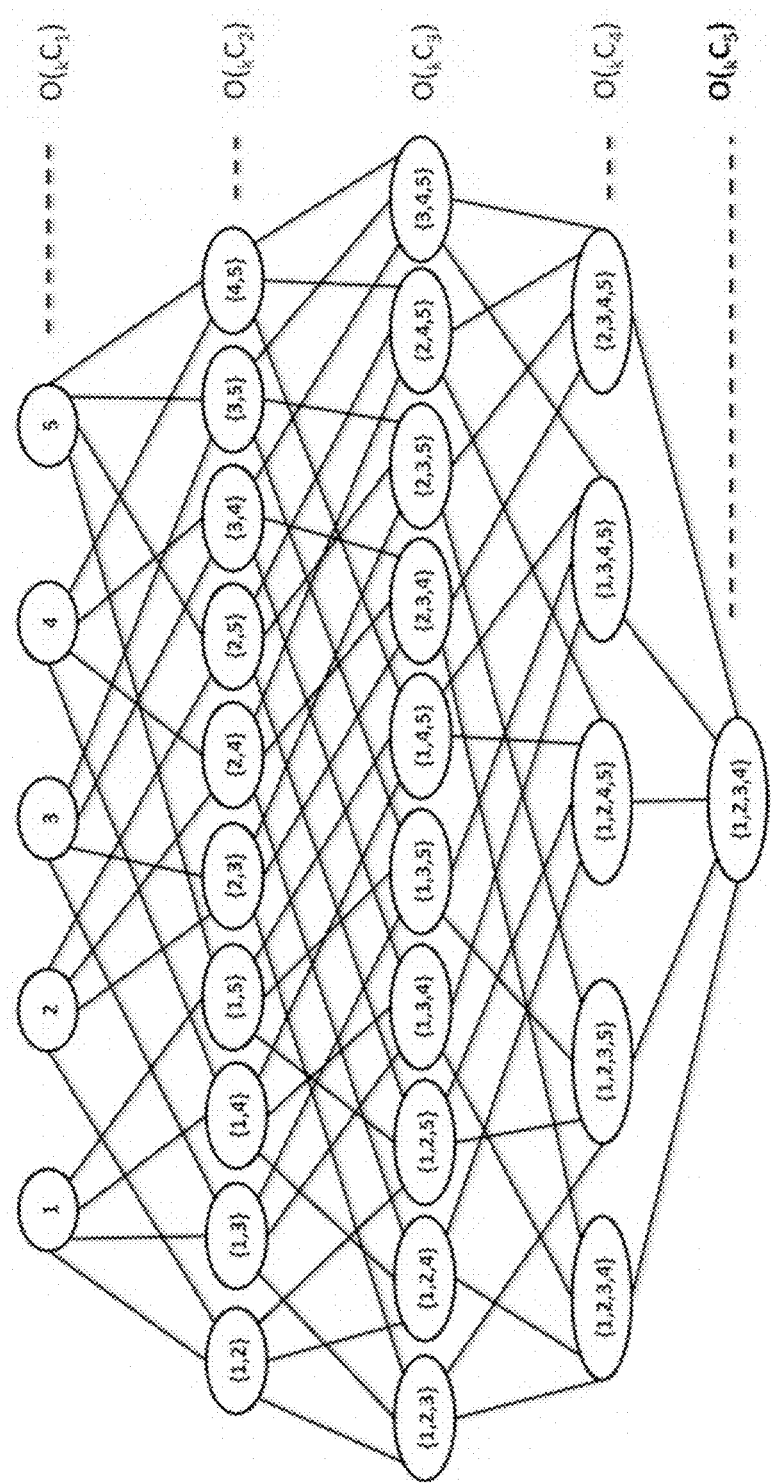
FIG. 1 shows a visualization of the exponential nature of frequent itemsets known in the prior art.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized.

DETAILED DESCRIPTION OF EXAMPLE EMBODIMENTS

References throughout this specification to one implementation, an implementation, one embodiment, an embodiment and/or the like means that a particular feature, structure, and/or characteristic described in connection with a particular implementation and/or embodiment is included in at least one implementation and/or embodiment of the disclosure. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope. In general, these and other issues vary with context. Therefore, particular context of description and/or usage provides helpful guidance regarding inferences to be drawn.

As will be described in greater detail below, a persistent data structure, the FHPTree, may be used as an index for frequent pattern databases, making targeted pattern mining and reoccurring data mining more efficient. Commonly used frequent pattern mining workflows tend to be an iterative discovery process. Thus, the minimum support threshold and additional filtering criteria may be varied iteratively, and the pattern mining algorithm would execute repeatedly. The FHPTree provides advantageous reuse of the data structure. Search is also a useful component of the FHPTree. The FHPTree offers an inclusive search features that, eludes bottom-up approaches. This search technique discovers only those patterns that contain a set of items, or attributes, of interest. The FHPTree may also support insert, update, and delete operations, enabling the underlying transaction database to evolve. It may not be necessary to rebuild the entire data structure of the FHPTree if a new item is introduced into the dataset or when new transactions are created. Previously discussed Apriori and the FPTree solutions are not ideal for dynamic data and struggle with the inclusive search feature. Thus, they may not be well suited to serve as or utilize persistent data structures like the FHPTree.

The proposed persistent data structure of the FHPTree consists of two parts: FHPTree and FHPGrowth. In the FHPTree section, the tree structure is utilized. In the FHP-Growth section, it is discussed how to extract frequent patterns may be extracted from the FHPTree persistent data structure. ARM tools utilize several traditional terminologies to define their operation. The traditional terminology used is defined as follows: let I=i1, i2, . . . , im be the set of all items. D be a database of transactions where each transaction T $\subset$ I. Ti is the set of all transactions containing i. A collection of items X $\subset$ I is referred to as an itemset. X is contained in T if, and only if, X $\subset$ T. An itemset is said to have support s if and only if s % of all transactions in D contain $R_a \subset R_c$. An itemset is frequent if and only if its corresponding support is greater than or equal to some user defined minimum support threshold, min_support. An itemset of size k is referred to as a k-itemset.

Enumerating all frequent pattern is NP-hard. The worst-case scenario, a dataset containing k items has $O(2^k)$ subsets. Suppose all of them co-occur frequently. Regardless of which algorithm is selected for the problem, the resulting set will consist of $O(2^k)$ patterns. An example of this type of pattern may be seen in FIG. 1. The persistent data structure of the FHPTree is a frequent pattern mining paradigm that focuses on detecting maximal frequent patterns without enumerating non-maximal patterns.

Figure 2:
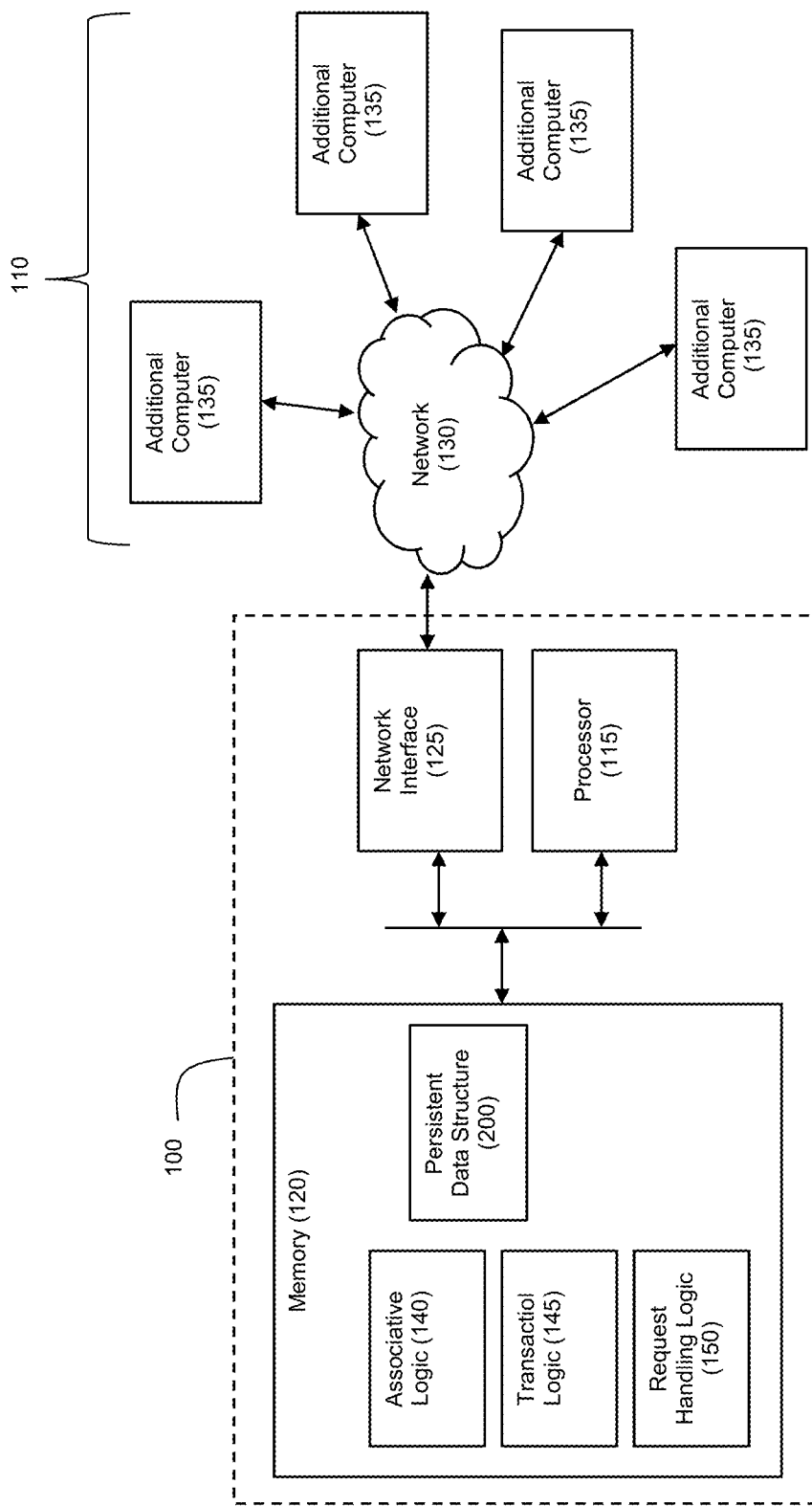
FIG. 2 illustrates an example computing system which may store and execute the persistent data structure in accordance with an embodiment of the disclosure.

FIG. 2 illustrates an example computing system 100 which may store and execute the persistent data structure 200 or FHPTree and FHPGrowth. The persistent data structure 200 or FHPTree can be employed within additional applications or programs to operate as a free software platform, a software-as-a-service (SaaS) platform, or may also be included within a software platform purchasable and licensed for use on a user's computing system. In some embodiments, the execution of the persistent data structure 200 or FHPTree may be implemented as part of a computing system 100 operating as one or more servers, such as a cluster computing system 110. The computing system 100 may comprise a processor 115, a memory 120, and a network interface 125. The processor 115, memory 120, and network interface 125 can interconnect with each other in any of a variety of manners (e.g., via a bus, via a network, etc.)

The network interface 125 can also provide an interface for the computing system 100 to a network 130. The network 130 can be any suitable communication network or combination of communication networks, such as the Internet, wired and wireless telecommunication networks, etc. Through networking, the persistent data structure 200 or FHPTree can interact with a plurality of additional computers 135 and/or a plurality of databases to share the processing load. The additional computers 135 and/or databases can take the form of any suitable computer (such as a desktop computer, laptop computer, tablet computer, smart phone) or larger computer system such as a server database. The network interface 125 may take any suitable form for carrying out network interface functions, examples of which include an Ethernet interface, a serial bus interface (e.g., Firewire, USB 2.0, etc.), a chipset, and antenna adapted to facilitate wireless communication, and/or any other interface that provides for wired and/or wireless communication. The network interface 125 may also include multiple network interfaces. Other configurations are possible as well.

The processor 115 may comprise one or more processors such as general-purpose processors (e.g., a single-core or multi-core microprocessor), special-purpose processors (e.g., an application-specific integrated circuit or digital-signal processor), programmable-logic devices (e.g., a field programmable gate array), etc. that are suitable for carrying out the operations described herein. In cluster computing 110 embodiments, a plurality of processors 115 on multiple computing systems 100 may work together to execute the persistent data structure 200 or FHPTree in parallel with each other to share the processing load and provide quicker results for executed queries.

To provide direction to a user of software housing the persistent data structure 200 or FHPTree, or to execute commands within the created trees of the FHPTree, the computing system 100 may have a display capable of showing a user a graphical user interface (GUI). The display may function as a user input device. The GUI may interact with the user dependent upon the device used to access the persistent data structure 200. In certain embodiments, the persistent data structure 200 or FHPTree may be located on a computing device having the computing system 100. The computing device may store and execute the persistent data structure 200 or FHPTree as a software application, or a mobile application for portable personal computing devices, for use by the user. In every embodiment, a user may interact with the GUI to access and execute the features of the persistent data structure 200. In some embodiments this may be accomplished by inputting keyboard or mouse commands to a input device of the computing system 100, and in other embodiments use of a touch screen or pressure sensitive display may be used to navigate the persistent data structure 200.

The memory 120 of the computing system 100 may comprise one or more non-transitory computer-readable storage mediums, such as volatile storage mediums (e.g., random access memory, registers, and/or cache) and/or non-volatile storage mediums (e.g., read-only memory, a hard-disk drive, a solid-state drive, flash memory, and/or an optical-storage device). The memory 120 may also be integrated in whole or in part with other components of the computing system 100. Further, the memory 120 may be local to the processor 115, it should be understood that the memory 120 (or portions of memory) could be remote from the processor 115, in which case the processor 115 may access such remote memory through network interface 125 (or some other network interface).

The memory 120 may store software programs or instructions that are executed by processor 120 during operation of the computing system 100. For example, the memory 120 may store the persistent data structure 200. Within the memory 120, different logical processes may be stored, which can take the form of a plurality of instructions configured for execution by processor 115. The memory 120 may also store associative logic 140, which can take the form of a plurality of instructions configured for execution by the processor 115 for evaluating, creating, assembling, and comparing item sets of the persistent data structure 200. The memory 120 may also store transaction logic 145, which can take the form of a plurality of instructions configured for execution by the processor for controlling how transactional information is inputted and associated by the persistent data structure 200. The memory 120 may also store request handling logic 150, which can take the form of a plurality of instructions configured for execution by the processor for controlling how users search, insert, delete, scan, or update the persistent data structure 200.

The memory 120 may also be configured as a database or other storage design where a set of memory addresses are arranged as the persistent data structure 200. It should be understood that the persistent data structure 200 can be a single data structure or a plurality of data structures. It should also be understood that the memory addresses used for the persistent data structure 200 need not be contiguous memory addresses. Moreover, which memory addresses are allocated to which particular, table, node, association, or item set can be fluid and change over time as the content of memory 120 changes.

The persistent data structure 200 may also be stored in the memories 310 of multiple computing system in a cluster computing system 300. In the cluster computing system 300, transactional data 315 enters the system and may be portioned into split data sets 320. An example cluster computing system 300 may be viewed in FIG. 3. Cluster computing is the concept of utilizing multiple computer machines together to solve a computational problem. Conceptually, a cluster computing system 300 can be interacted with as if it were a single machine with a single massive file system with a shared disk pool. The fundamental difference is that this cluster framework allows for the file system to scale horizontally by connecting more machines. In many scenarios, the cluster computing system 300 will have a master node 325 and a collection of slave nodes 330. All of these machines are connected and can communicate over a high-speed network through their respective network interfaces. This may be accomplished either through wired or wireless connection between the master and slave nodes (325 and 330). The master node 325 plays the role of the conductor and is responsible for task allocations and job scheduling. The master node 325 also usually acts as a gateway to the slave nodes 330. That is to say, all instructions are passed directly to the master node 325, and it will partition the work and distribute individual tasks to the slave nodes 330.

Figure 3:
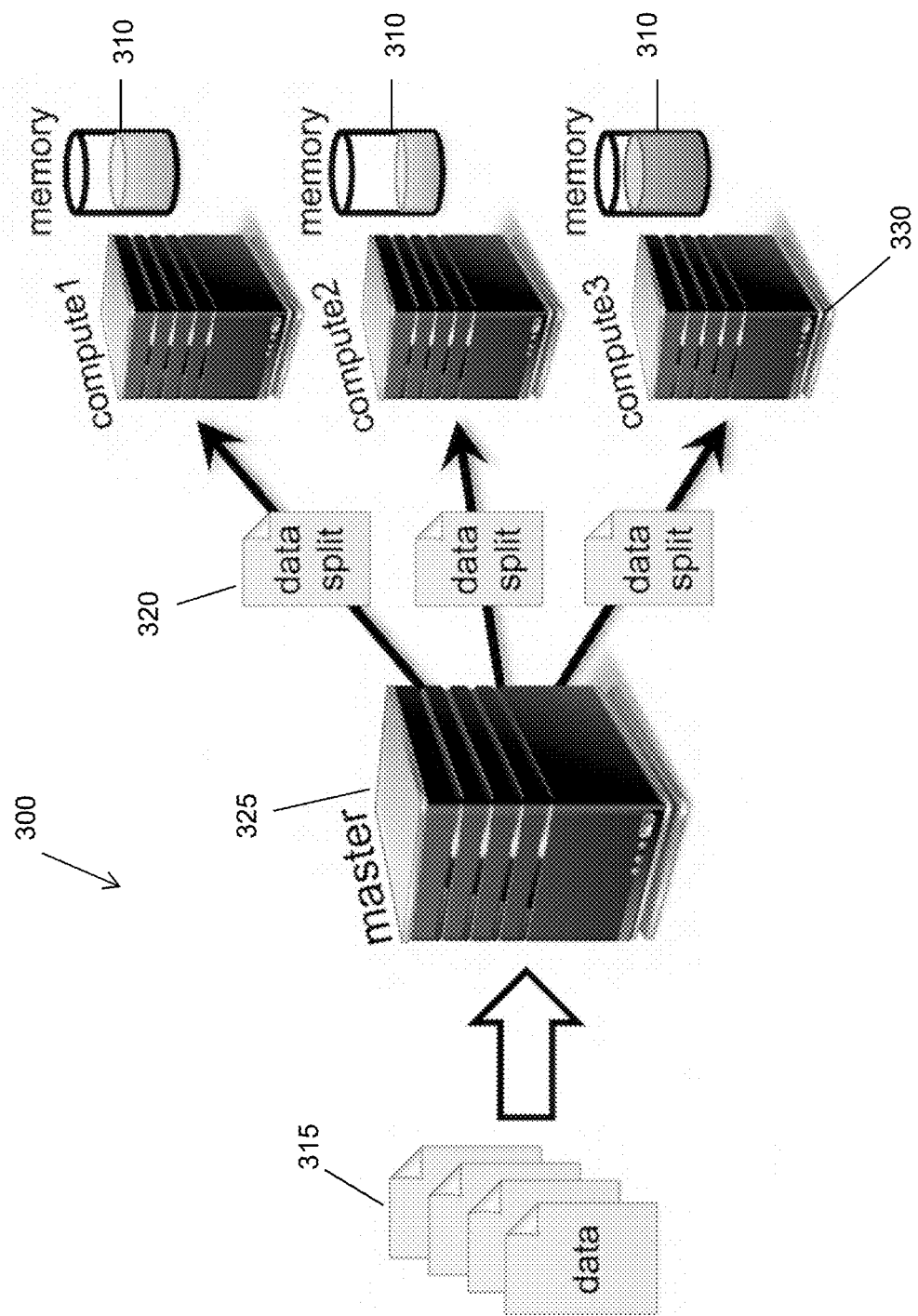
FIG. 3 shows an example cluster computing environment in accordance with an embodiment of the disclosure.

A distributed in-memory computing framework is designed to provide not only a shared disk pool, but a distributed memory space as well. Since disk operations are significantly slower than those that are performed in-memory, it makes sense why bringing this sort of concept to large-scale cluster computing system 300 frameworks can produce a huge effect on performance and overall throughput. Distributed in-memory computing framework systems like this are designed to allow data to persist in memory 310 and to be shared between various computational workloads. The jobs need not be running simultaneously, or even in tandem. A wide array of applications have been built on top of these distributed in-memory computing framework systems to create a reliable memory centric distributed storage system. FIG. 3 demonstrates the high-level conceptual layout of an in-memory cluster computing system.

FIG. 3 shows transactional data 315 being loaded onto the cluster, passing through the master node 325 to be evenly distributed as split data sets 320 across the slave nodes 330 where it will be either written to disk or persisted in memory 310. It is important to mention that these systems are designed to be fault tolerant. Each piece of data is replicated multiple times and stored on multiple machines to ensure that if a machine goes down data will not be lost.

One of the fundamental challenges of cluster computing systems 300 relates to data locality. Repetitively transferring data across the network can be expensive and, at times, unnecessary. Data that will need to be compared with one another is preferably on the same machine, so if this data can be loaded to the same machine initially, unnecessary expensive operations can be prevented in the future.

Although clusters can be interacted with in a manner similar to a single file system, there are limitations that necessitate a clear distinction. In a cluster, the memory pool is disjointed, so data on one node cannot be accessed directly from another node. This is why in many languages designed for cluster computing are functional: they are based on lambda calculus. All operations can be thought of as a series of transformations on the data. This makes manipulating the data, although it physical partitioned across many machines, naturally parallelizable. Since the persistent data structure 200 may utilize this type of infrastructure, the methods proposed by the embodiments are naturally horizontally scalable, fault tolerant, and memory centric. As a result, the persistent data structure 200 can develop high throughput and reliable computational pipelines that are appropriate for large-scale data analytics.

With the ubiquity of distributed computing frameworks, it has become significantly more affordable for people to ingest, transform, and visualize large amounts of data. Frameworks such as Hadoop and Apache Spark are completely open-source and have strong communities providing support and advancements on a regular basis. Part of the appeal of these frameworks is that they are open-source, but also that they are designed to run on commodity hardware. Creating a big data ecosystem is now as easy as setting up cluster of relatively-inexpensive nodes connected over an Ethernet network.

In recent years, advancements have been made in the in-memory cluster computing systems 300. These frameworks quickly became known throughout the big data community after setting the world data sorting record at the annual Terasort competition. In 2013, a Hadoop cluster of 2,100 nodes (2 2.3 Ghz hexcore Xeon E5-2630, 64 GB memory, 12x3 TB disks) set the record for sorting 102.5 terabytes of data in 4,328 seconds, approximately 1.42 terabytes per minute. In 2014, Apache Spark surpassed this record with a runtime of 1,406 seconds, approximately 4.27 terabytes per minute, and used a fraction of the hardware resources: 207 nodes (32 vCores-2.5 Ghz Intel Xeon E5-2670 v2, 244 GB memory, 8x800 GB SSD).

As stated above, the persistent data structure 200 may be implemented on either a single server computing system 100 or parallelized with a cluster computing system 300. To maximize the tree formation and pattern searching, the persistent data structure 200 presents a top down approach seen in FIG. 4. Previous data mining systems, such as Apriori and Growth based, discussed above, are bottom up approaches. In bottom-up approaches, subset patterns are discovered before superset patterns. As the length of a pattern increases, bottom-up approaches begin to experience delays. The complexity to discover a single pattern is proportional to its length. Top-down approaches discover superset patterns before subset patterns. As a result, the complexity to discover a single pattern is inversely proportional to its length. The algorithm of the persistent data structure 200, FHPGrowth, is a frequent pattern mining paradigm. The algorithm approach begins the traversal with the set of all items, the reverse enumeration tree removes a single item at a time, while the FHPTree allows multiple items to be pruned simultaneously.

In Figure for the first part of the persistent data structure 200 represents a tree construction 400. Within the tree construction 400, nodes are created as parent nodes 405 and child nodes 410 in a tree like branching structure. Data information from a transaction database 415 is fed into the tree construction 400 to create the trees of the persistent data structure 200. Operations are available within the tree construction 400 that may be used as an insert operation 420 to the tree, a update operation 425 to the tree, or a delete operation 430 to the underlying tree.

After the tree construction 400 of the transaction database 415 is complete, an algorithm of the traversal portion 435 can acquire patterns from within the treed formation. A pattern operation 440 may be executed upon the tree structure to determine the frequency and location of such patterns within the transaction database 415. Operations are also available within the traversal portion 435 that may be used as a scan operation 445 to the tree, or a search operation 450 to the tree to find the patterns of the transaction database 415. Each of these operations is a top-down traversal operation based on the highest nodes in which the requested pattern operation 440 can be detected.

Figure 4:
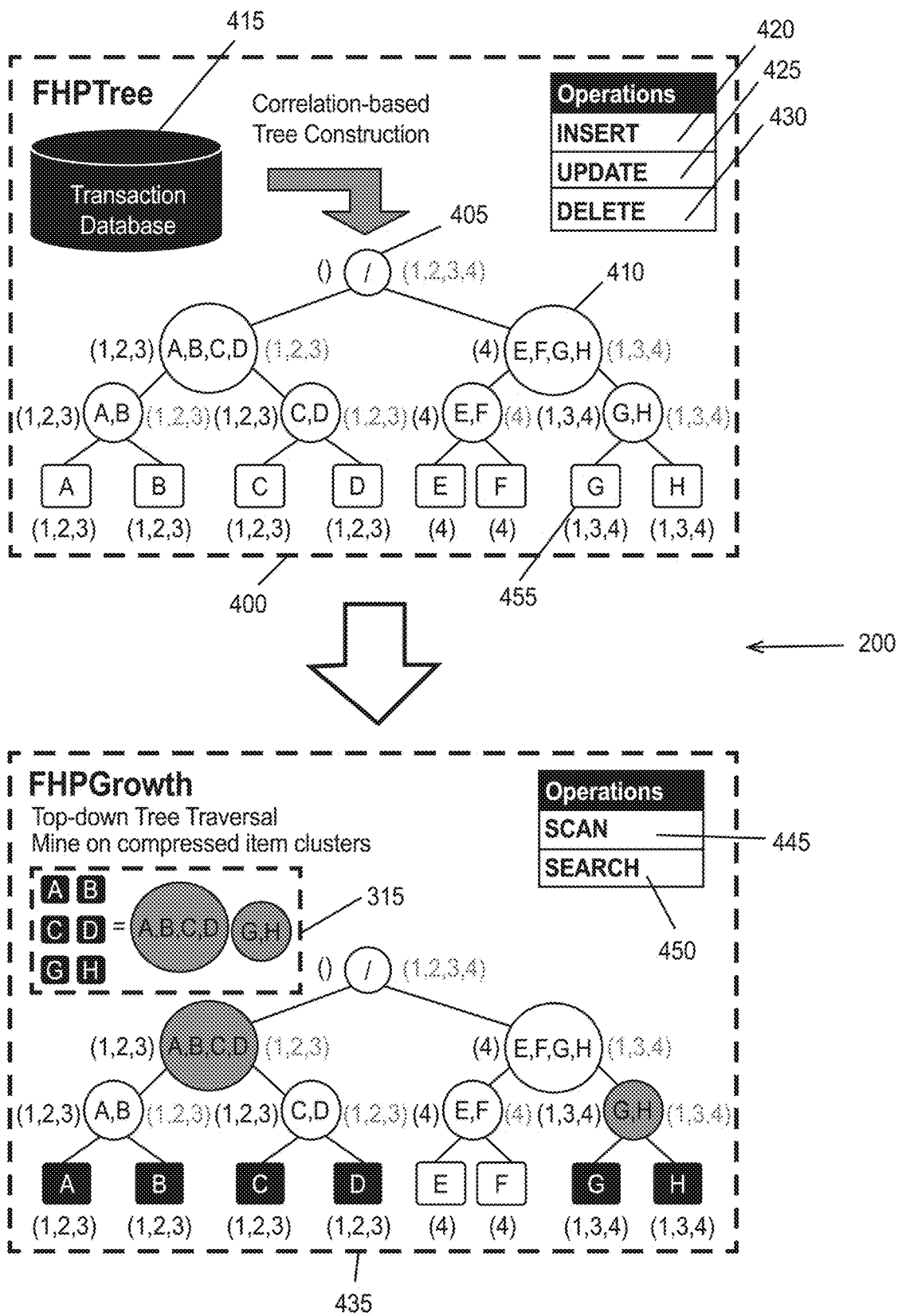
FIG. 4 shows an high level overall architecture of the persistent data structure in accordance with an embodiment of the disclosure.

A conceptual overview of the persistent data structure 200 of FIG. 4 can be described below. Suppose I is bifurcated into two equal sets, $I_1$ and $I_2$. Consider $I_1$ and $I_2$ as items such that $T_{11}=\cup T_i$ for all $i \in I_1$ and $T_{12}=\cup T_i$ for all $i \in I_2$. $T_{11}$ and $T_{12}$ can be thought of as candidate transaction sets. The question is asked, is $\{I_1, I_2\}$ a frequent itemset based on this candidate transaction support? If the answer is no, then the itemset $\{i,j\}$ cannot possibly be frequent for any $i \subset I_1, j \subset I_2$, where i and j are nonempty. This conditional statement, $T_{11} \cap T_{12} \geq \min\_support$, can reduce the search space by $2^{|I_1|+|I_2|}-2^{|I_1|}-2^{|I_2|}$. For example, with 10 items, the search space is reduced from 1024 by $2^{10}-2^5-2^5=960$. Thus, only 64 potential patterns remain. If the answer is yes, then $\{i, j\}$ may be a frequent itemset for any $i \subset I_1, j \subset I_2$, so the search is continued by bifurcating $I_1$ or $I_2$, potentially yielding $I_1, I_3$, and $I_4$. Then a check is performed if $\{I_1, I_3, I_4\}$ is a frequent itemset where $T_{Ia}=\cup T_i$ for all $i \in I_a$. If no, then $\{i, j, k\}$ cannot possibly be frequent for any $i \in I_1, j \in I_3$, and $k \in I_4$, reducing the search space by the amount defined in the below equation.

$$2^{|I_1|+|I_2|+|I_3|}-(2^{|I_1|+|I_2|}-2^{|I_1|}-2^{|I_2|})-(2^{|I_1|+|I_3|}-2^{|I_1|}-2^{|I_3|})-(2^{|I_2|+|I_3|}-2^{|I_2|}-2^{|I_3|})-2^{|I_1|}-2^{|I_2|}-2^{|I_3|}$$

This filtering technique can yield an exponential reduction in the search space. A second equation, shown below, characterizes the potential reduction in search space. Let A be a set of sets of items, referred to as a hierarchical pattern, resulting from the recursive bifurcation of I. P(A) is the power set of A.

$$z(A) = 2^{\Sigma_{a \in A}|a|} - \sum_{A' \in P(A)-A} z(A')$$

This recursive bifurcation process is also referred to as agglomerative clustering and is a way to define the structure of the persistent data structure 200. Notice that each step in the traversal attempts to increase the hierarchical pattern length by one. The persistent data structure 200 is used to aggressively grow frequent patterns while quickly pruning the search space.

A fundamental advantage of the persistent data structure 200 is its ability to represent multiple items as a single node in the tree. By evaluating combinations of persistent data structure nodes, a hierarchical pattern, a user can effectively evaluate the support of many itemsets simultaneously, which enables multiple itemsets to be filtered at once. The FHP- Growth section, or traversal section 435 of the persistent data structure 200, of FIG. 4 demonstrates how the FHP-Tree, or tree construction 400, can be leveraged to find large itemsets by considering few nodes in the tree.

One of the main contributions offered by the persistent data structure 200 is the structure of the tree is not dependent on the data distribution. The number of nodes in an FHP-Tree, or the tree construction 400, increases linearly relative to the number of unique items in the transaction database 415. However, the size of each node may increase as the number of transactions increases.

First, each node consists of u and $T_u$, the label of the node and a set, respectively. $T_u$ can be a set, or a set of sets. Second, the tree construction topology is bound by $T_u = f(T_C)$, where C is the set of children of u; child nodes 410 determine the set stored in their parent node 405. From that perspective, it is natural to build an FHPTree or persistent data structure 200 from the bottom-up.

Frequent single items form the leaf nodes 455. $cT_u$ is referred to as the item's candidate transaction list, and $xT_u$ is the exact transaction set. In embodiments, several traversal schemes are presented, and some only make use of candidate transactions, while others leverage both candidate and exact transaction sets. The exact transactions may be an optional feature for the FHPTree or persistent data structure.

Figure 5:
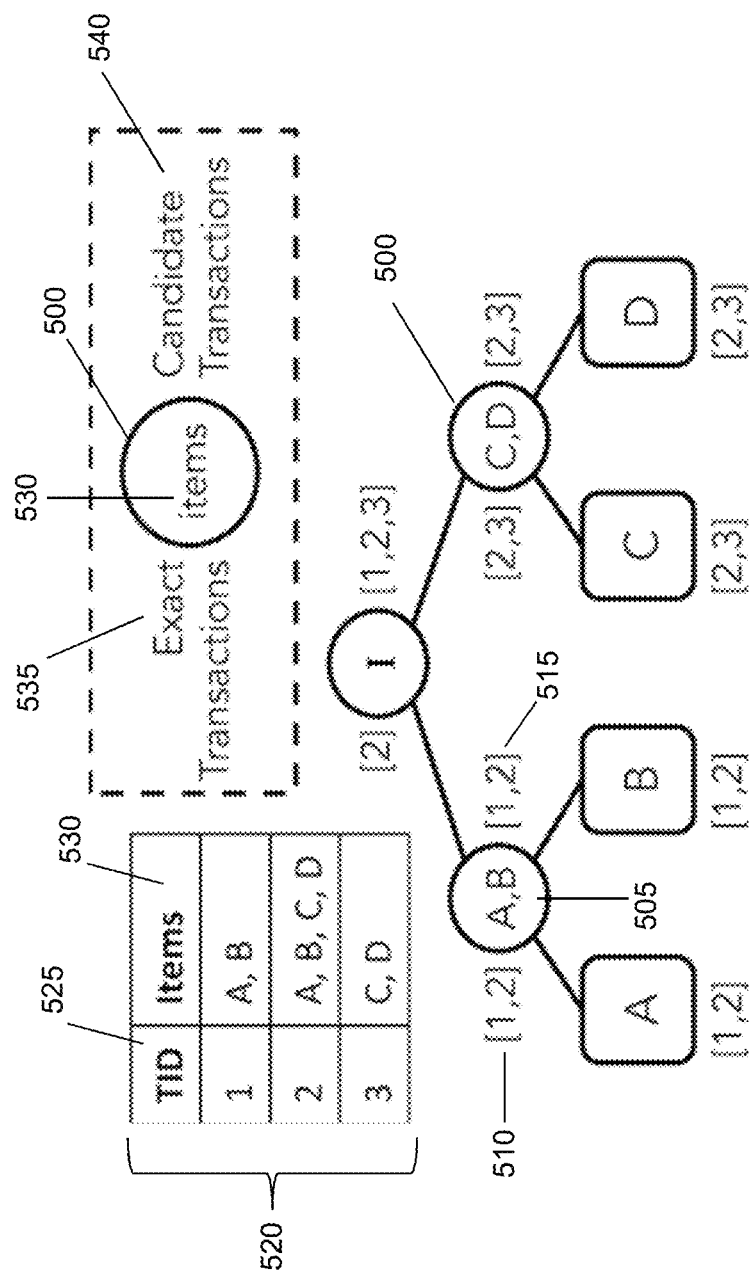
FIG. 5 shows an example tree produced for a simple transaction database using the persistent data structure in accordance with an embodiment of the disclosure.

As seen in FIG. 5, the persistent data structure 200 is a recursively defined tree structure having nodes 500 of the form (u, $cT_u$, $xT_u$), composed of a label 505, u, and two sets (510 and 515), $cT_u$ and $xT_u$. In FIG. 5, the transaction database 520 has a list of transactions 525 identifying items 530 of the corresponding transaction. The label 505 of the node 500 may list the items 530 associated with that node 500. A first transaction set, exact transactions 535, list the transactions which may be associated with a node based on a query to the persistent data structure 200. The second transaction set, candidate transactions 540, list the transaction associated with the node from the items listed in its child nodes. The edge set is defined such that for every u, $cT_u = \cup_{c \in C} cT_c$ and $xT_u = \cap_{c \in C} xT_c$ where C is the set of children of u. The set union and set intersection operations constrain the candidate and exact transaction sets 535 and 540, respectively. As a result, each node or collection of nodes will have a candidate frequency and an exact frequency. If a collection of nodes is said to be candidate frequent, that implies the candidate frequency exceeds the minimum support threshold. If nodes are referred to as frequent, that references the exact support. Candidate frequency is always greater than or equal to the exact frequency, so if a collection of nodes is not candidate frequent, it cannot be frequent. Also, $xT_u = cT_u$ for all leaf nodes, so it is only necessary to store one copy. Further detail regarding the candidate and exact transaction sets 535 and 540 and their distinct usage is provided in the scan portion of the persistent data structure 200 described later.

Another point to notice is the similarity between this recursive bifurcation strategy discussed previously and the tree construction 400 of the persistent data structure 200. From a top-down perspective, the FHPTree is defined such that nodes are bifurcated to form children. This is what allows the FHPTree to aggressively grow frequent patterns while quickly filtering the search space. Mining efficiency using the tree structure of the persistent data structure 200 is possible because of this.

The traversal section 435 of the persistent data structure 200 demonstrates an example of a descendant-ancestor relationship. The shaded leaf nodes are descendants of the shaded non-leaf nodes in FIG. 4. This relationship allows users to prune the search space during the mining process. If a hierarchical pattern is not candidate frequent, there is no need to consider any of its descendants.

Before attempting to build data structures or mining data, the user can set a user defined minimum support threshold, min_support. Next, a scan of the database, D, can be accomplished to calculate the support for each unique item, i. I(s) may be discarded where support(i)<min_support. It is important to note that this min_support threshold will serve as a lower bound for any frequent pattern mining analysis. That is to say, this tree can be mined for frequent patterns at any higher support threshold. Let F be the set of all frequent items, and let the frequent items in F form the leaf nodes of an FHPTree in the tree construction 400 of the persistent data structure 200.

The pseudocode for this generalized construction procedure of the tree is provided in FIG. 6. In this example, the binary values of the tree nodes are focused upon. To form the next layer in the tree, all nodes are arranged or formed by F into $$\left\lceil \frac{|F|}{2} \right\rceil$$

non-overlapping pairs. Each pair (i:j) is merged to form a node u, calculating the new candidate transactions union of their sets, $cT_u = cT_i \cup cT_j$. This merge, also forms two edges connecting i and u as well as j and u. In the case where there are an odd number of nodes, the data structure cannot form a set of non-overlapping pairs that covers all nodes at a given level of the tree, so, the data structure simply moves the single odd node up to the next level of the FHPTree. This process is executed recursively until one node remains.

There are a few points to emphasize for the tree construction 400 of the persistent data structure 200. The construction process requires only one database scan. The number of nodes in the tree scales linearly as the number of distinct frequent items in the transaction database 415; given n frequent items, there are 2n−1 nodes in the FHPTree. The min_support threshold defined when building the tree sets an absolute minimum support threshold for mining frequent patterns. That is to say, utilizing the data structure a user is able to mine for frequent patterns having any min_support value greater than this absolute minimum support defined during construction.

The persistent data structure 200 creates a tree architecture that does not suffer from the limitations of an ineffective tree formation. To illustrate how an ineffective tree may appears, let n be a node that has two children x and y with transaction sets that differ significantly. In the worst case, suppose $cT_x \cup cT_y = T$ and $cT_x \cap cT_y$ is nonempty. Then, $cT_n = T$ and the candidate support of n is 100%, while the support is 0%. As a result, every itemset containing n or an ancestor of n is guaranteed to be frequent, however the likelihood of x and y being part of a frequent itemset is nil. This is the worst case scenario, as all comparisons involving n are wasted computation. A tree should be constructed to ensure that sibling nodes, such as x and y, are similar in terms of their transaction sets.

To accomplish this, the persistent data structure 200 utilizes an agglomerative or hierarchical clustering technique. Similar to the classic hierarchical clustering techniques, the persistent data structure 200 is built from the bottom up. When constructing the next level in the tree, the goal is to identify pair clusters such that each cluster consists of two nodes and a node cannot belong to more than one cluster. Each cluster forms a node in the next level of the FHPTree. To clarify, for node n with children x and y, n was formed by the pair cluster containing x and y. FIG. 7 illustrates this tree correlation based construction of the persistent data structure 200.

In practice, the persistent data structure 200 may utilize the Jaccaard Index as a similarity measure between transaction sets, as shown in the below equation. Since both candidate and exact transaction sets are present, a linear combination is utilized of both Jaccaard indices.

$$JaccaardDistance(T_x, T_y) = 1 - \frac{|(T_x \cap T_y)|}{|(T_x \cup T_y)|}$$

$$Similarity(x, y) = c_1 * J(cT_x, cT_y) + c_2 * J(xT_x, xT_y)$$

Other similarity measures were considered and may be used including intersection cardinality, Euclidean distance, Hamming distance, and Srensen-Dice coefficient as well. Although other measures may potentially achieve better FHPTrees, the Jaccaard index proved most useful thus far, improving scan and search performance. Correlation-based construction contributes to improved search and scan efficiency for the FHPTree. Although binary FHPTrees are discussed in the above example, other schemes can be applied to define the connectivity of the FHPTree.

Figure 8:
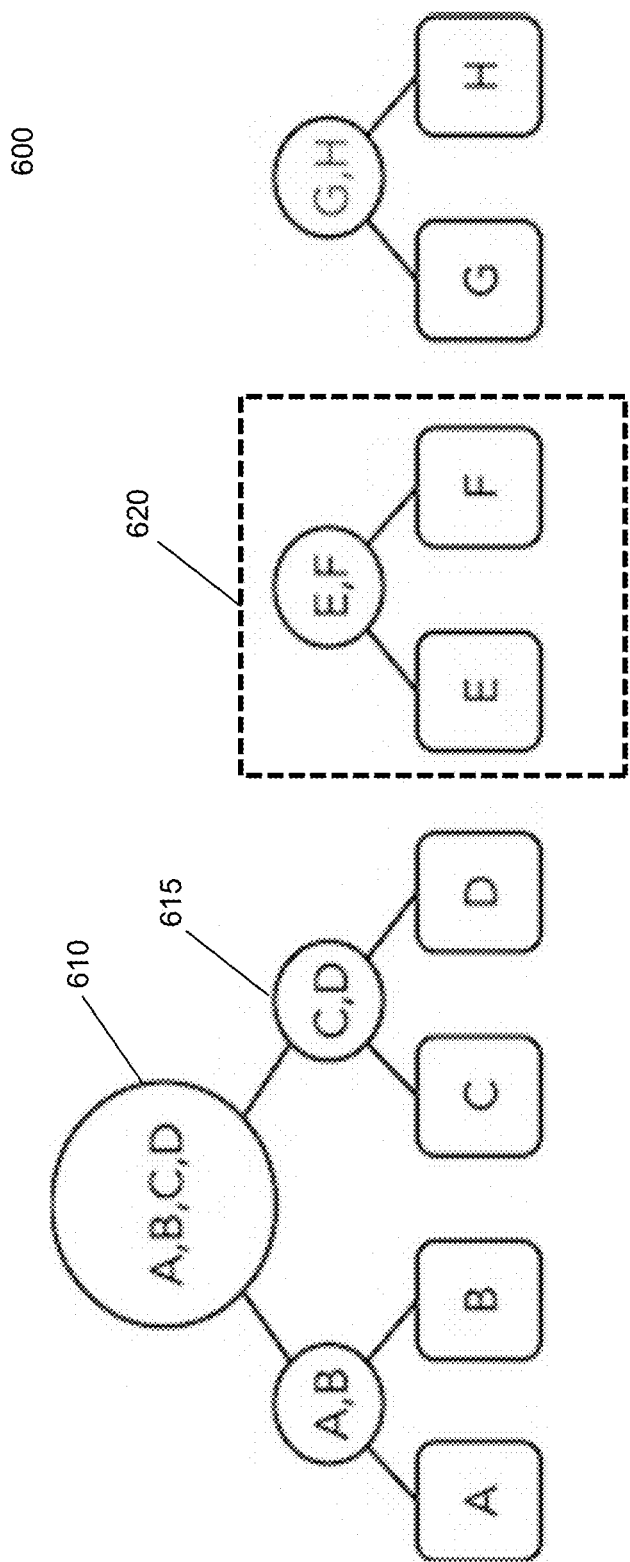
FIG. 8 shows an example forest architecture for the persistent data structure in accordance with an embodiment of the disclosure.

FIG. 8 provides a visual illustration of a forest architecture 600 of multiple trees having parent 610 and child 615 node. Connecting similar nodes within the forest is advantageous. Nodes that never co-occur 620 should not be part of the same tree. That is to say, non-overlapping clusters of items that never co-occur 620, should not be a part of the same tree. As a result, the tree construction process may yield an FHPForest, a collection of FHPTrees for the persistent data structure 200. In FIG. 8, sparse datasets and datasets that are composed of multiple subpopulations will benefit from this technique as unnecessary computation is reduced during the frequent pattern extraction process.

Figure 9:
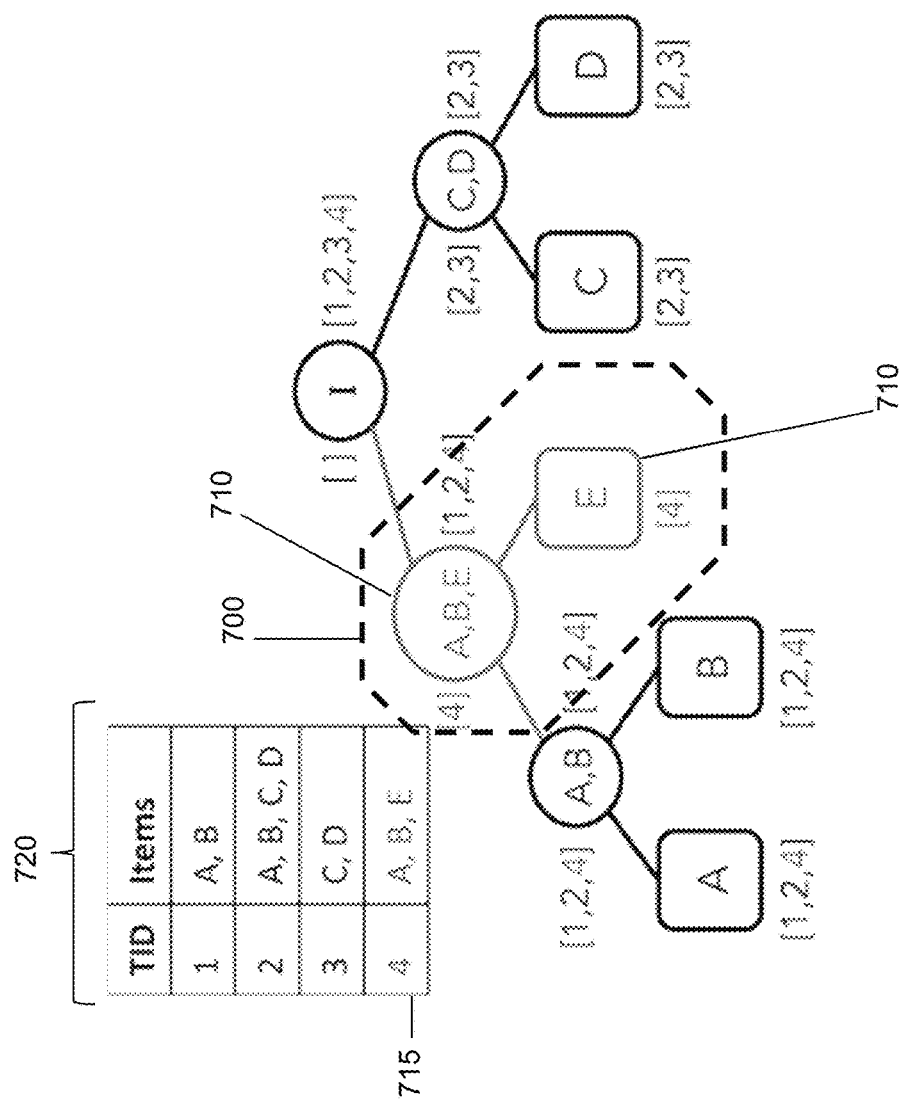
FIG. 9 shows an example of an insert operation inserting a node into a tree of the persistent data structure in accordance with an embodiment of the disclosure.

In FIG. 9, an example of the insert operation 700 of the persistent data structure 200 is viewed. The insert operation 700 is defined as the addition of a new node 710 to an existing FHPTree. A new node 710 is created when a novel item 715 is detected in the transaction database 720, or the minimum support threshold used to build the tree is reduced. Let u∈I be a new item. To integrate u into the FHPTree, a new node 710 is defined as, (u, $T_u$). The primary goal is to preserve the existing connections while pairing u with the most mutually-similar node. FIG. 9 provides a visual representation of an insert operation 700 performed on an FHPTree.

The pseudocode for the insert operation 700 is provided in FIG. 10.

To ensure the new node 710 u is paired with its most mutually-similar node, a top-down insertions is performed. The persistent data structure 200 traverses the tree beginning at the root, and evaluates the correlation between its children, C. Let C'={c∈C|Distance(u,c)<Distance(c, C-c)}. If C' is not empty, a recursive call is performed on the c ∈C' with the minimum Distance. Otherwise, if C' is empty, u is paired with the last node visited, node. The details of the Pair function are illustrated in FIG. 9, however, they are omitted from the algorithm for readability. Similarly, UpdateAncestorTransactions is not detailed, but the logic consists of a traversing the path from node to the root node, updating the transaction sets along the way.

An alternative solution for building an FHPTree may be sequentially inserting items. It is important to note that this insert operation 700 is greedy, and the insertion order influences the quality of the tree. That is to say, under this scheme, it is not guaranteed that the insert operation 700 will yield the best tree. As a result, after a series of insert operations, it may be advantageous to rebuild the tree.

Furthermore, the persistent data structure 200 may utilized an update operation. The update operation is the modification of an existing node. This operation does not modify the underlying structure of the FHPTree. Situations that would utilize an update operation include the addition of a new transaction containing existing items, the removal of a transaction, or changing the label of a node. Changing the label is trivial. Updating the transactions sets, required more effort and is a bottom-up approach. When adding or deleting a transaction, each item in the transaction is a leaf node in the FHPTree; each of those nodes will be updated by modifying the transaction set accordingly. Next all of the ancestors of the modified nodes are updated as well.

This can be an expensive operation depending on the size of the transaction added or removed. The action of updating the ancestors introduces overhead. In the worst case, all nodes will be modified. With this in mind, it is important to note that multiple update operations may be performed simultaneously. Updates should be buffered and executed at once to reduce the impact of ancestor overhead.

There is also a case where new transactions, boosts the support of an item such that it becomes frequent. This newly frequent item is not currently in the FHPTree, so it needs to be inserted. The persistent data structure 200 stores a hash map to track infrequent items and their corresponding transaction sets. If a new transaction causes an item to surpass the min_support threshold, it is categorized as the insert operation.

Figure 11:
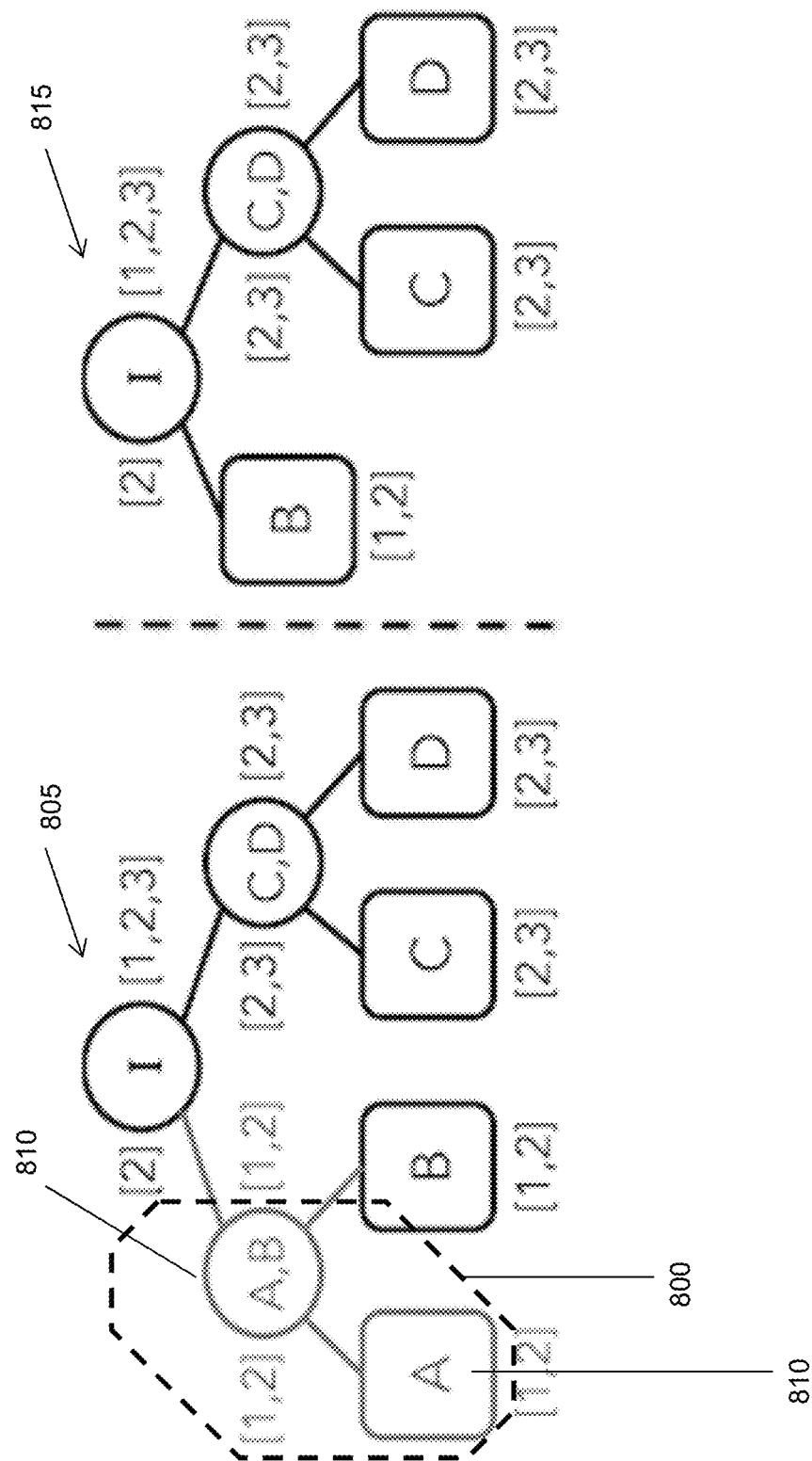
FIG. 11 shows an example of a delete operation removing a node from a tree of the persistent data structure in accordance with an embodiment of the disclosure.

FIG. 11 provides a visual representation of the delete operation 800. The left side 805 of FIG. 11 shows the deleted node 810 as part of the tree before the delete operation 800 and the right side 815 show the tree after the deleted node 810 is removed. The delete operation 800 is the inverse of the insert operation 700. That is to say, the removal of a node from an FHPTree. This is a bottom-up approach. If the node has multiple siblings, on may simply delete the node. If the node has a single sibling, one may delete the node and parent. The sibling node assumes the role of its former parent. The pseudocode for the delete operation is viewed in FIG. 12.

Similar to the insert operation 700, deleting nodes also affects the transaction sets of their surviving ancestors. As a result, the persistent data structure 200 may update the transaction sets for those surviving ancestors using the logic defined in the tree construction section.

The structure of the tree construction scales linearly relative to the number of distinct items, it serves as a persistent data structure 200, and supports insert, update, and delete operations. FHPGrowth is a general term used to denote the process of frequent pattern mining using an FHPTree for the traversal section of the persistent data structure 200. Scan and search operations are instances of FHPGrowth.

Scan is the familiar task of extracting all frequent patterns. The traversal paradigm employed is a recursive depth-first strategy where each state of the traversal consists of a collection of nodes A ⊂ U that are currently visited. With this in mind, the traversal is defined as a transition between states and define each state as $A_i \subset U$, the set of nodes visited during the $i^{th}$ step of the traversal.

Transitions are performed by mapping. That is to say, transitions are defined by a mapping g such that $g(A_i)=A_{i+1}$. However, each transition on a FHPTree traversal yields three states $\{A_{i+1}, A_j, A_k\}$, so the mapping is written as $g(A_i)=\{A_{i+1}, A_j, A_k\}$. $A_{i+1}$ is referred to as a descendant state of $A_i$. Furthermore, any descendant state of $A_{i+1}$ is also a descendant of $A_i$. The mechanism to determine these states selects a non-leaf node $\alpha \in A_i$ and analyzes its children. The below equation and pseudocode of FIG. 13 define the transitioning mechanism of the persistent data structure 200.

$$A_{i+1}=(A_i-\alpha) \cup children(\alpha)$$

$$A_j=(A_i-\alpha) \cup leftChild(\alpha)$$

$$A_k=(A_i-\alpha) \cup rightChild(\alpha)$$

$A_j$ and $A_k$ are not visited immediately. They are visited during a backtracking phase. The order in which these states are visited determines whether frequent patterns are discovered in a top-down fashion or bottom-up. By visiting the state containing the longer hierarchical pattern, $A_{i+1}$, first, guaranteed maximal itemsets are discovered before their subsets.

Before considering a transition to state $A_{i+1}$, the persistent data structure 200 checks the support of $A_i$, which is defined as $$\left| \bigcap_{v \in V} cT_v \right|.$$

If it meets the min_support threshold and $A_i$ contains at least one non-leaf node, the persistent data structure 200 continues on to state $A_{i+1}$. If all $\alpha \in A_i$ are leaf-nodes or $A_i$ does not meet the min_support threshold, then the descendants of $A_i$ are pruned, and the traversal begins backtracking. In all cases, the traversal begins at the initial state, $A_0=\{root\}$, and continues until all states have been visited or pruned.

The persistent data structure 200 may also perform maximal frequent itemset detection. Since all non-maximal frequent itemsets are subsets of and therefore a direct implication of some maximal frequent itemset, non-maximal itemsets can been viewed as redundant and unnecessary information. The traversal section strategy of the persistent data structure 200 demonstrated enables a user to identify maximal itemsets before their subsets. Now, the task is preventing the discovery of non-maximal frequent itemsets. Before a branch of the FHPTree is traversed, a check is performed if the branch has already been "covered". The follow definitions describe the relationship between a pattern and a cover.

For pattern cover, the persistent data structure 200 lets $V \subset U$ be a frequent pattern. $C \subset U$ is a cover of V if and only if for every $v \in V$, there exists a $c \in C$ such that v is a descendant of c. The trivial pattern cover in an FHPTree is the root node. Since every node is a descendant of the root, any combination of those nodes will also be a descendant of the root.

For perfect pattern cover, let $V \subset U$ be a frequent pattern, and $C \subset U$ be a cover of V. C is a perfect cover if and only if for every $c \in C$, there exists a $v \in V$ such that c is an ancestor of v and for every $c_1, c_2 \in C$; $c_1$ is not a descendent of $c_2$. A perfect pattern cover has an added constraint that the cover cannot contain extraneous items. This reduces the number of covers; the trivial cover is only a perfect cover for the pattern containing all items.

The persistent data structure 200 is presented so that a maximal perfect pattern cover may be determined. For the maximal perfect pattern cover (MPPC), let $V \subset U$ be a frequent pattern, and $C \subset U$ be a perfect cover of V. C is maximal if and only if there exists no perfect cover of V, $S \subset U$, such that $S \neq C$ and S is a perfect cover of C. Each pattern has a unique maximal perfect pattern cover (MPPC). In addition, each MPPC has a unique frequent pattern. In order to prevent unnecessary traversal steps in FHPGrowth, the MPPC can be stored based on the pseudocode shown in FIG. 14.

The pseudocode algorithm is an extension of scan algorithm described above. On line 19 of above algorithm, in addition to saving frequent itemsets, MPPCs for said patterns are also saved. As shown on lines 12 and 15, the next state in the FHPGrowth traversal cannot be covered to proceed. It is only necessary to check when traversing to individual children; both children cannot possibly be covered or the previous state would have been covered.

Once the MPPC is determined by the persistent data structure 200, mining of the MPPC may commence. There is a one-to-one mapping from maximal frequent patterns to MPPC. As a result, patterns may be considered functionally equivalent to their respective MPPCs. Thus, users of the persistent data structure 200 can simply mine for MPPCs and reduce the traversal depth required during FHPGrowth. In addition to utilizing cT, the candidate transactions, at each node, this utilizes the exact transactions, xT. Using xT, for any collection of nodes in an FHPTree, the persistent data structure 200 knows the exact support for frequent patterns it represents.

FIG. 15 shows a pseudocode algorithm as an extension of the two scan algorithms described above. By adding lines 5-9 in this algorithm, the persistent data structure 200 is able to identify maximal frequent itemsets using MPPCs. Referring back to the FHPGrowth section of FIG. 4, the MPPC is represented by the two identified non-leaf nodes. The corresponding maximal frequent itemset is represented by the six other identified leaf nodes.

Figure 16:
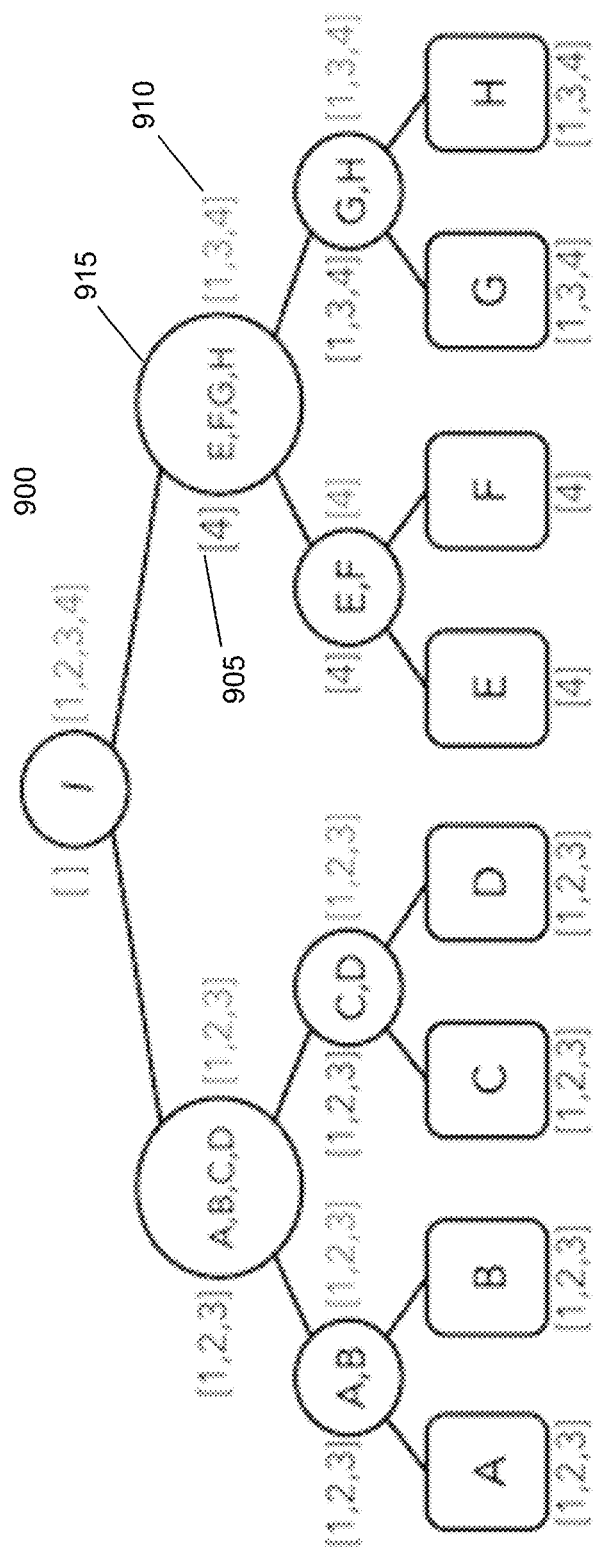
FIG. 16 shows an example tree of the persistent data structure based on an example transaction set in accordance with an embodiment of the disclosure.

To demonstrate how frequent patterns can be discovered using the FHPTree, consider the example transaction dataset defined below. FIG. 16 provides an illustration of how this FHPTree may be constructed.

| TID | Items |
| --- | --- |
| 1 | ABCDGH |
| 2 | ABCD |
| 3 | ABCDGH |
| 4 | EFGH |

Suppose a tree is built with a min_support threshold of 25%. Since there are four transactions in total, this implies that all items are frequent, and F={A, B, C, D, E, F, G, H}. The FHPTree is built from the bottom up where F is the set of leaf nodes. Each node 915 contains a candidate transaction set 910 and an exact transaction set 905. FIG. 16 provides a visual of the resulting FHPTree 900.

Figure 17:
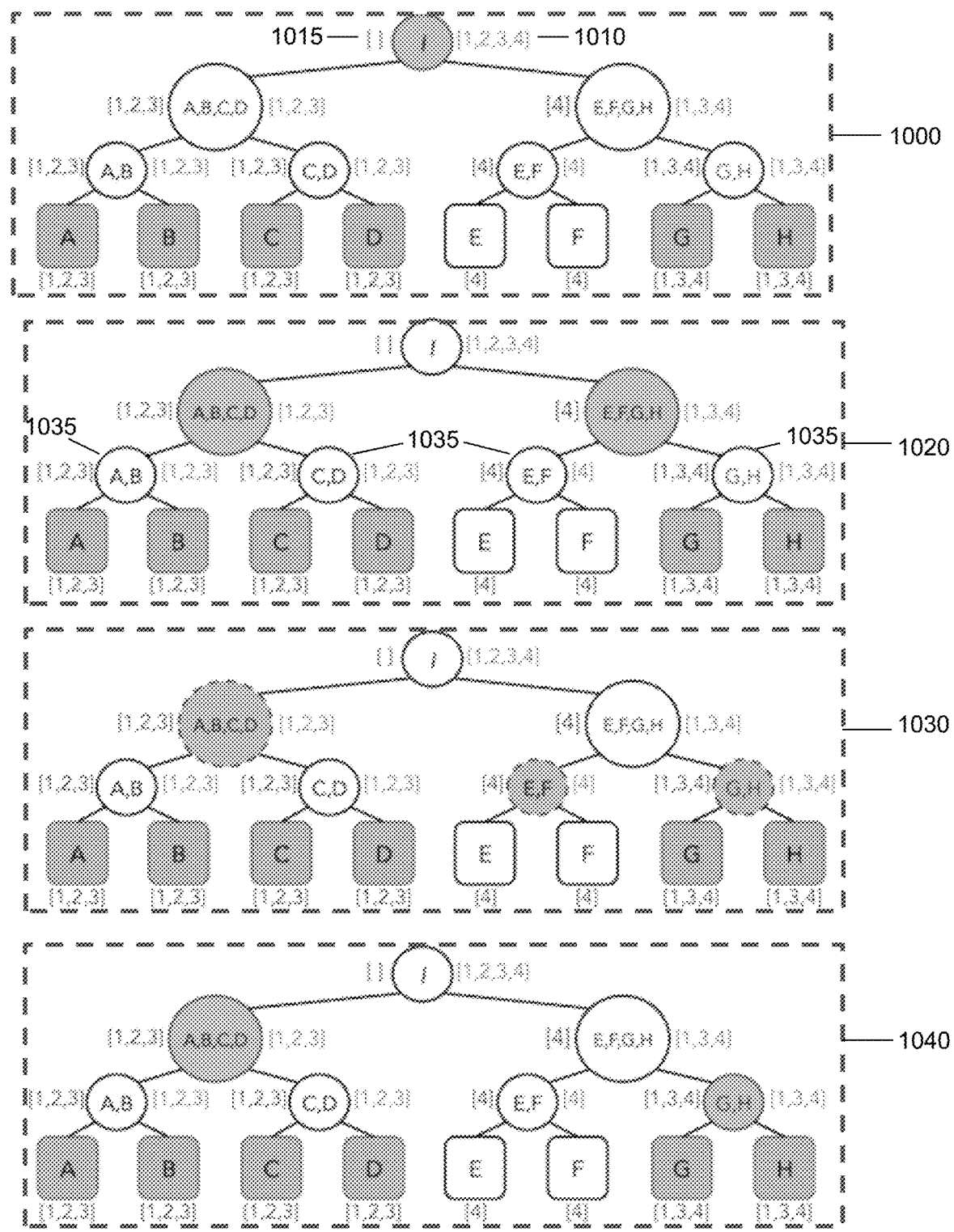
FIG. 17 shows and example of a traversal to detect a frequent pattern within an example tree of the persistent data structure in accordance with an embodiment of the disclosure.

The persistent data structure 200 will mine the FHPTree with a min_support threshold of 50%, so for this example a pattern must occur in two transactions to be frequent. Now, to identify frequent itemsets, the traversal begins following the pseudocode in above discussed algorithms. This procedure is detailed visually in FIG. 17.

The initial state 1000 of the traversal (a) is $A_0=1$. First, the candidate support 1010 is considered, which exceeds the min_support threshold, so the exact support 1015 is considered. The exact transaction set for the root node is empty, which implies that no transactions contain all items in F. Since the current state is candidate frequent, the traversal will continue by splitting a node. Using the traversal mapping, g, to determine the next state in the traversal $g(A_0)=\{A_1, A_j, A_k\}$. The below equation provides more details about the next descendant states.

$$A_1 = \{ABCD, EFGH\}$$

$$A_{j,1} = \{ABCD\}$$

$$A_{k,1} = \{EFGH\}$$

Before proceeding, a check is made that the next state has not been covered. No patterns have been detected yet, so it cannot be covered. Recall that $A_1$ is the next state and $A_{j,1}$ and $A_{k,1}$ will be visited during backtracking. The next step 1020 is to analyze the candidate support of $A_1$. The candidate support of $A_1$ is $|\{1, 2, 3\} \cap \{1, 3, 4\}|=2$, which exceeds the min_support threshold. Check the exact support of $A_1$, $|\{1, 2, 3\} \cap \{4\}|=0$; a frequent pattern has not been discovered. $A_1$ contains non-leaf nodes 1035, so the traversal continues, $g(A_1)=\{A_2, A_{j,2}, A_{k,2}\}$. More detail about the next descendant states is given in the below equation.

$$A_2 = \{ABCD, EF, GH\}$$

$$A_{j,2} = \{ABCD, EF\}$$

$$A_{k,2} = \{ABCD, GH\}$$

The candidate support 1030 of $A_2$ is $|\{1, 2, 3\} \cap \{4\} \cap \{1, 3, 4\}|=0$ fails to meet the min_support threshold, so the traversal is halted and consideration of state $A_{k,2}$ proceeds next. $A_{k,2}$ has not been covered yet, and the candidate support is $|\{1, 2, 3\} \cap \{1, 3, 4\}|=2$ passing the min_support threshold. The exact support of $A_{k,2} |\{1, 2, 3\} \cap \{1, 3, 4\} \cap=2$, meeting the min_support threshold and implying that a frequent pattern has been discovered. The persistent data structure 200 saves the itemset $\{A, B, C, D, G, H\}$ and the MPPC $\{ABCD, GH\}$ 1040. Next, the algorithm would continue to state $A_{j,2}$ where it would fail the min_support checks and backtracking would begin. This process is continued until all states are visited and all maximal patterns have been detected.

Figure 18:
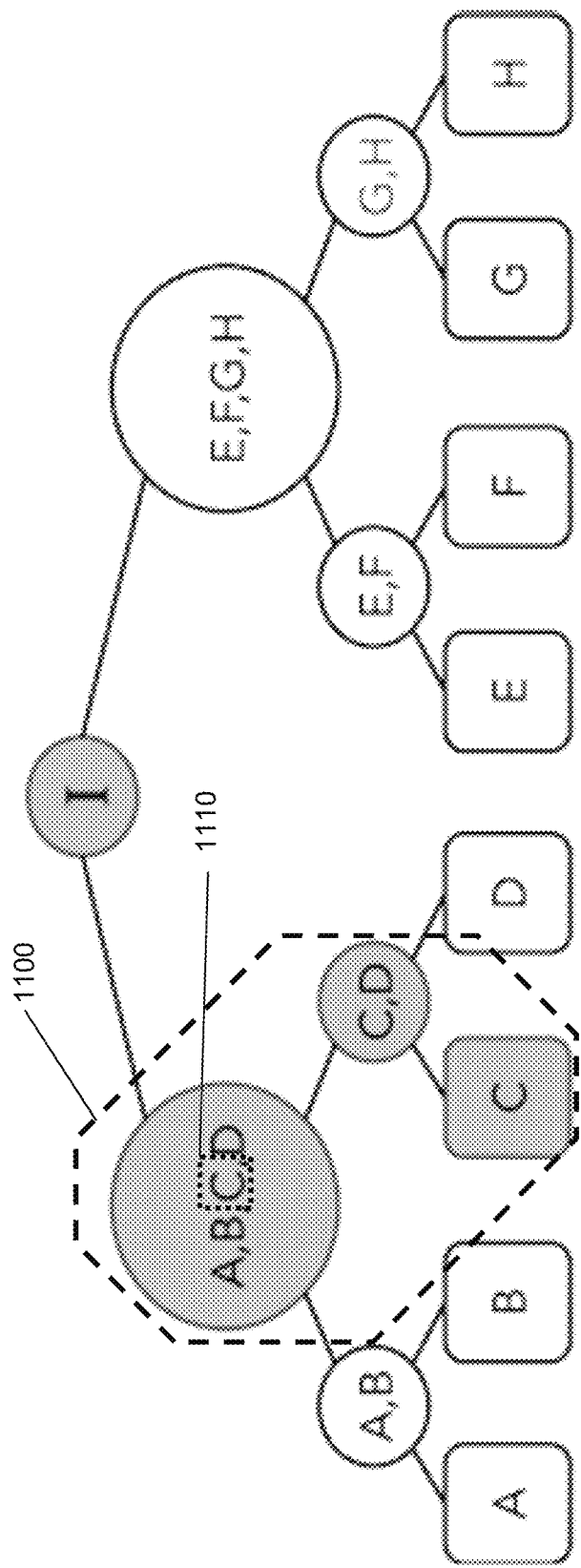
FIG. 18 is an example of a search operation locating a pattern within a tree of the persistent data structure in accordance with an embodiment of the disclosure.

The persistent data structure 200 also has a search operation 1100 illustrated in FIG. 18. The search operation takes a query item or items as input. The result is the collection of all frequent patterns containing the query item or items. Bottom-up approaches struggle with this feature and may perform it as a post processing technique. From a top-down perspective, if the current state does not contain the query item, then its subsets, descendant states, do not either. In contrast, descendant states in bottom-up approaches contain new items and may not be capable of this sort of on-the-fly inclusive filter.

The persistent data structure 200 prevents the enumeration of all frequent patterns as an intermediate step and provide a targeted mining feature. Fortunately, the logic for this approach is quite similar as that of the scan operation. The fundamental difference involves restricting the traversal of FHPGrowth.

FIG. 18 highlights the ancestors of a query item, c 1110. All states of the FHPGrowth traversal include at least one of the ancestors of c. This enables detection of all patterns containing the query items, while ignoring unrelated items. FIG. 19 shows a pseudocode algorithm for the search operation is disclosed below.

The pseudocode for the search operation 1100 provided in this algorithm is an extension of the logic defined in the scan operation. This pseudocode provides the complete pseudocode for the scan operation with the addition of two if conditions. The if-conditions may require that at each state of the traversal the nodes cover the items provided in the query.

Examples and Evaluation of the Persistent Data Structure (FHPTree and FHPGrowth)

A series of experiments were employed to evaluate the performance of FHPTrees and FHPGrowth. Evaluations were based on runtime and scalability. The Tree Construction, Insert, Delete, Scan, and Search methods described above were performed for these experiments. For the Scan operation, existing frequent pattern mining algorithms, CHARM-MFI and FPMax, are considered as baselines for performance against the persistent data structure 200. Currently, the most efficient maximal pattern mining algorithms distributed in Java Open-Source Pattern Mining Library (SPMF) are CHARM-MFI and FPMax. CHARM-MFI is Apriori-based and an extension of the CHARM algorithm; first closed patterns are detected and a post-processing filter identifies those that are also maximal. FPMax, an extension of FPGrowth, utilizes the FPTree and directly identifies maximal frequent patterns.

In these experiments, five datasets were used: chess, chainstore, connect, pumsb, and a series of synthetic datasets. Chess and chainstore are classic datasets commonly used for benchmarking frequent pattern mining algorithms. Chess consists of 75 distinct items across 3196 transaction that have an average size of 37 items. Chainstore contains digital customer transactions from a retail store. There are roughly 46,000 distinct items, 1.1 million transactions, and each transaction has an average size of seven items. Connect is composed of spacial information collected from the connect-4 game. This data contains 67,557 transactions and 129 distinct items. Pumsb consists of census data for population and housing. It is composed of 49,000 transactions with more than 2,100 distinct items. The synthetic datasets are simulated transaction databases of increasing size and are used for the Insert and Delete experiments. All experiments were conducted on a single-core server with 120 GB of RAM.

Evaluation of Tree Construction Using the Persistent Data Structure

Figure 20:
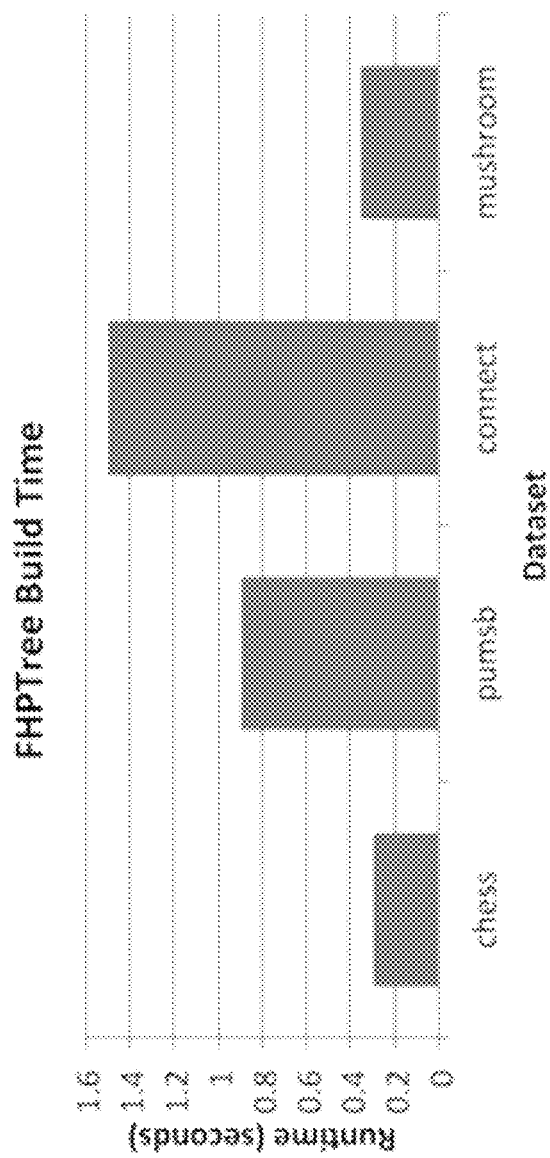
FIG. 20 illustrates a graphical representation of run build times for datasets using the persistent data structure in accordance with an embodiment of the disclosure.

In this experiment, the runtime for building the FHPTree using the chess, connect, pumsb, and mushroom datasets was benchmarked. In addition, factors that determine the size of FHPTrees and evaluate the memory footprint were addressed. The goal is to illustrate the worst case performance and discuss the important factors that determine the runtime. The most expensive operation in the tree construction approach is the iterative pairwise comparison. When searching for the most similar pair of items, all cooccurring items are evaluated in order to find the best matches. In the worst case, all items co-occur, and $$\frac{n(n-1)}{2}$$

comparisons are performed when forming each layer of the tree, where n is the number of nodes in the current layer of the tree. As a result, the scalability is a concern as the number of distinct items increases. FIG. 20 illustrates the run build times for each respective dataset.

Each recursively defined layer may require $O(n^2)$ comparisons, each layer has roughly half the items from the previous layer, and there are log(n) layers. The below equation defines an upper bound for the number of comparisons required to build an FHPTree from n leaf nodes.

$$n^2 \times \sum_{k=o}^{\log(n)} \left(\frac{1}{2}\right)^{2k} < n^2 + \frac{n^2}{3}$$

Figure 21:
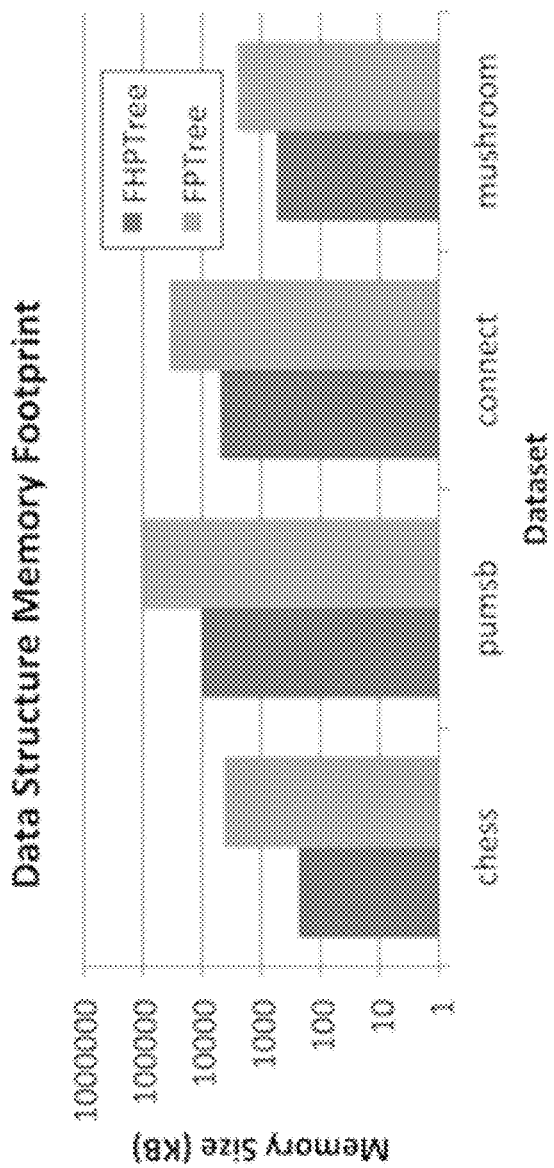
FIG. 21 provides a graphical representation of a comparison between the FHPTree and FPTree in terms of their memory footprint with respect to example datasets in accordance with an embodiment of the disclosure.

It is important to recall that the number of nodes in an FHPTree is not dependent on the distribution of the data. Given k distinct items, there will always be 2k-1 nodes and 2k-2 edges in the FHPTree. Also, in practice, a BitSet data structure was utilized to represent transaction sets, so the footprint may be small. This notion makes it easy to estimate the size of an FHPTree and thus, easier to estimate hardware requirements. FIG. 21 provides a comparison between the FHPTree and FPTree in terms of their memory footprint.

The FHPTree has a small footprint, up to 10× smaller than the FPTree for these select datasets. At each node, the candidate transactions may contain redundant information since the exact transactions are a subset, which suggests that the footprint could be reduced further.

The performance difference between chess and connect in the build time graphic suggests the runtime is impacted by the distribution of data and the number of transactions. Similarly there is a noticeable impact on the memory footprint. The chess and connect datasets FHPTrees have nearly the same number of nodes; however, the density and transaction count make connect more computationally intensive. Since the FHPTree serves as a persistent data structure 200, this does not have to be a reoccurring challenge.

Evaluation of Insert and Delete Operations Using the Persistent Data Structure

Figure 22:
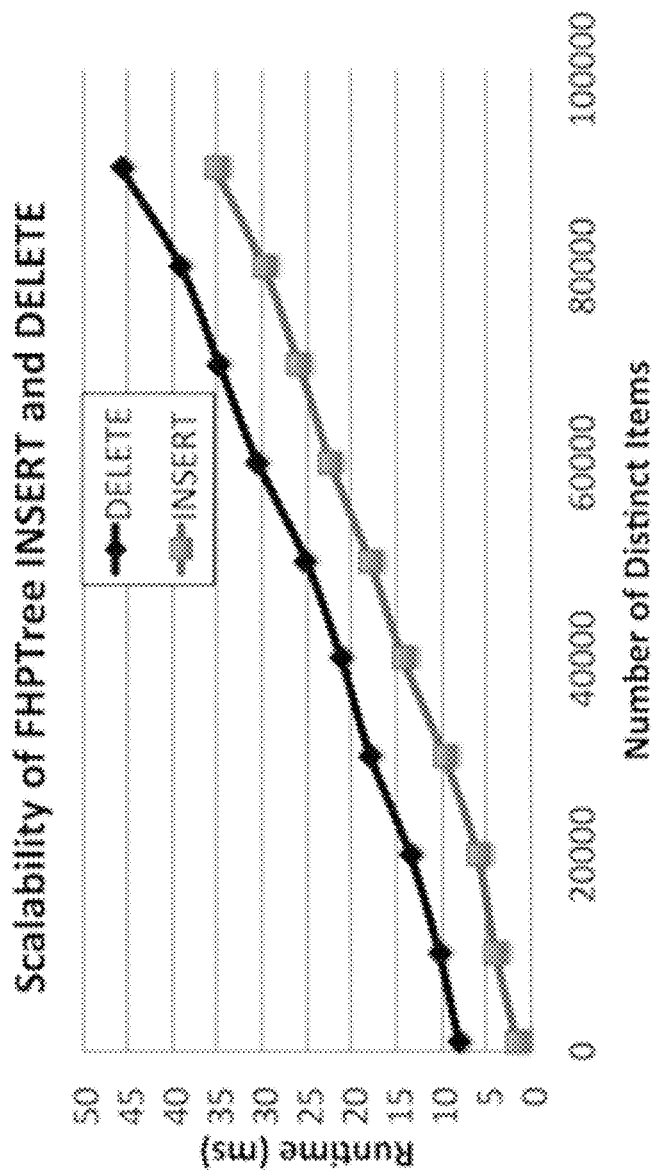
FIG. 22 shows a graphical representation of the scalability of the persistent data structures insert and delete functionalities.

To evaluate the performance of insert and delete operations, FHPTrees of various sizes were built to perform insert and delete operations. The runtime is recorded when performing ten of the respective operations. The goal was to characterize the impact the FHPTree size has on performance. FIG. 22 shows the scalability of the persistent data structures insert and delete functionalities.

Even on the largest tree, consisting of 200,000 nodes, the overall runtime required for ten insert or delete operations is less than 50 ms. The number of traversal steps for either operation is proportional to log(n), where n is the number of leaves in the FHPTree. The four datasets discussed previously were also considered. Each tree was built while excluding an item. Then, the excluded item was inserted into the tree. Every item was excluded and inserted, and the average runtime was collected. For each datasets, the average insert time was approximately 1 ms. Results were consistent for the delete operation as well.

Runtimes this fast suggest that an alternative solution for building an FHPTree may be sequentially inserting items. One of the main drawbacks is that the approach may not yield an effective FHPTree. The order in which the items are inserted can affect the topology of the tree.

Evaluation of the Scan Operation Using the Persistent Data Structure

Figure 23:
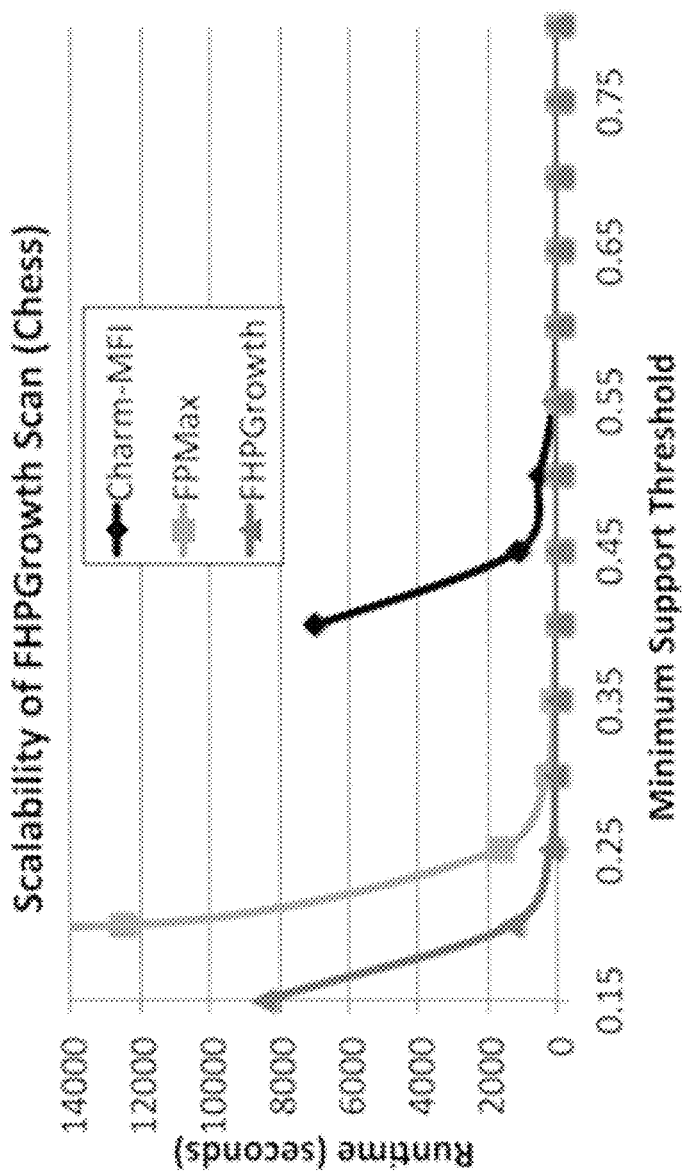
FIG. 23 shows a graphical representation of the runtime relative to the min_support threshold for various data structures in accordance with an embodiment of the disclosure.
Figure 24:
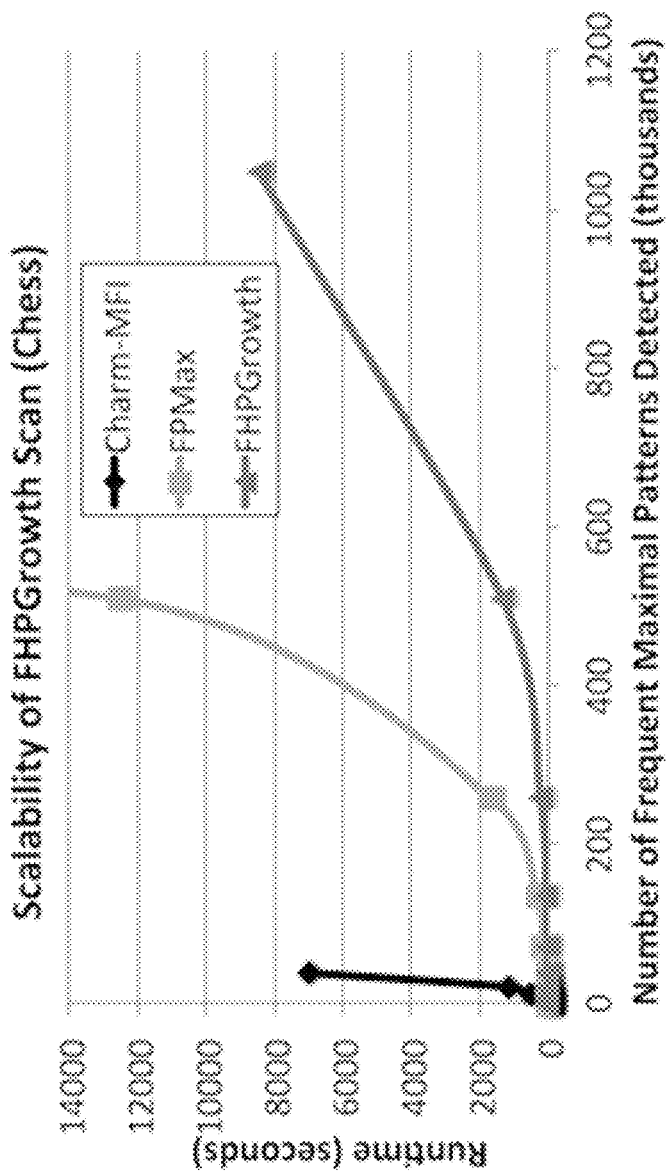
FIG. 24 shows a graphical representation of the runtime relative to the number of frequent patterns detected for various data structures in accordance with an embodiment of the disclosure.

Since this is the classic problem of frequent pattern mining, the traversal portion (FHPGrowth) of the persistent data structure 200 was compared with existing approaches: FPMax and CHARM-MFI. It is important to mention that the runtimes reported for the scan operation do not include the time required for tree construction as the tree is a persistent structure, i.e., it is only built once and used by all scans. The first test is extracting maximal frequent patterns from the chess dataset. FIG. 23 characterizes the runtime relative to the min_support threshold. At high support values, FPMax is fastest by a narrow margin, but as the min_support threshold becomes small, the number of maximal frequent patterns increases, and FPMax begins to slow. At 40% support, both FPMax and FHPGrowth are more than 300× faster than CHARM-MFI. At the lowest support value of 15%, FHPGrowth is 14× faster than FPMax. Also considered, is the runtime relative to the number of frequent patterns detected, as shown in FIG. 24.

The chess dataset used in this experiment is quite small. Its density, high degree of connectivity between items, is what makes the dataset challenging. The CHARMMFI algorithm wasn't able to survive below 35% support. FPMax and FHPGrowth were comparable in performance until around 45% support where FHPGrowth begins to gain a significant advantage. FHPGrowth was able to detect the top one million patterns faster the FPMax could detect the top 500 thousand.

Figure 25:
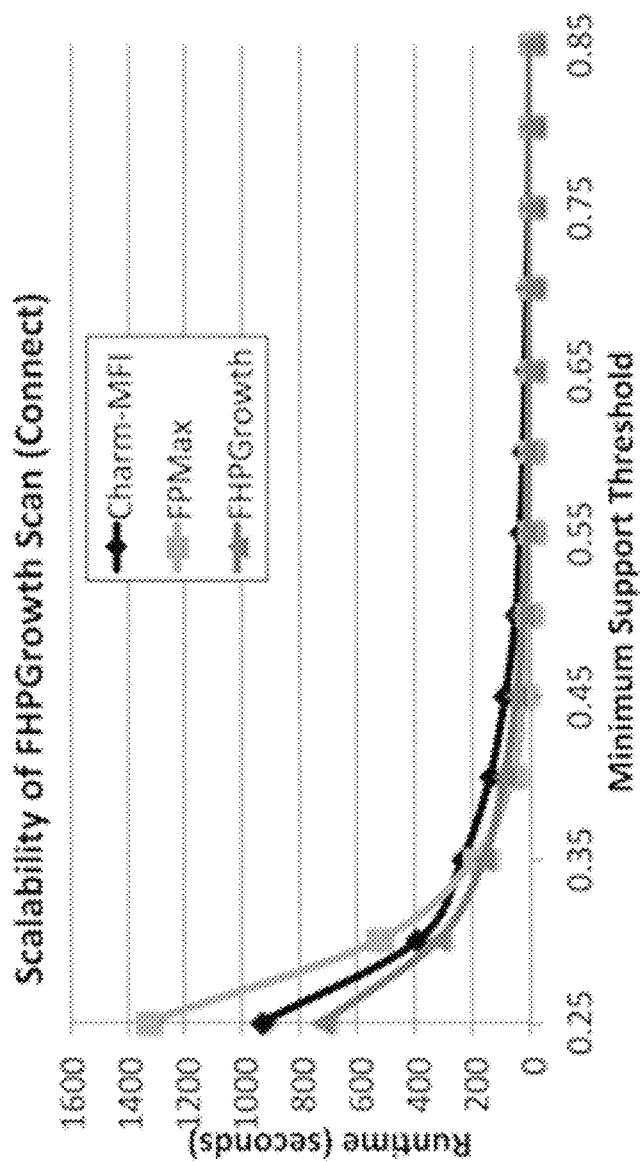
FIG. 25 shows a graphical representation of the connect dataset with respect to runtime vs. min_support threshold for various data structures in accordance with an embodiment of the disclosure.

Next, the connect dataset is shown in FIG. 25 with respect to runtime vs. minimum support threshold for various data structures.

This dataset is larger than chess in terms of transactions. Connect contains fewer but longer maximal frequent patterns. At high support values, FPMax is the fastest, but once min_support drops below 35%, CHARM-MFI and FHPGrowth take the advantage. At the lowest support value, FHPGrowth is roughly 20% faster than CHARM-MFI and 2× faster than FPMax.

Figure 26:
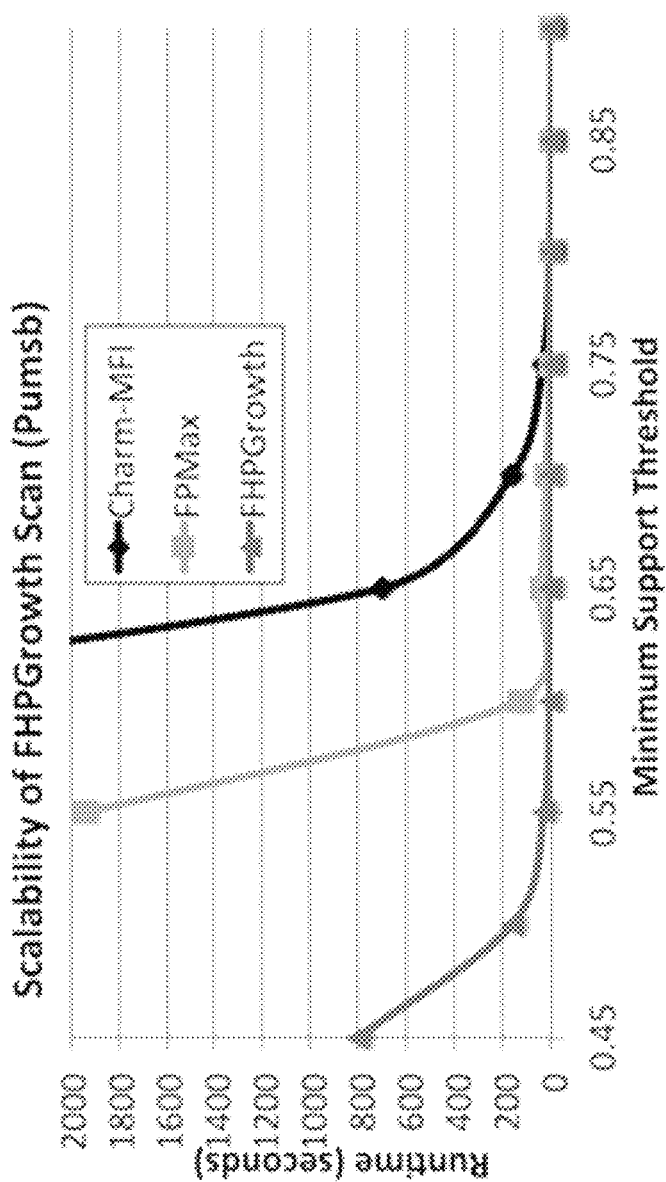
FIG. 26 shows a graphical representation of the pumsb dataset respect to runtime vs. min_support threshold for various data structures in accordance with an embodiment of the disclosure.
Figure 27:
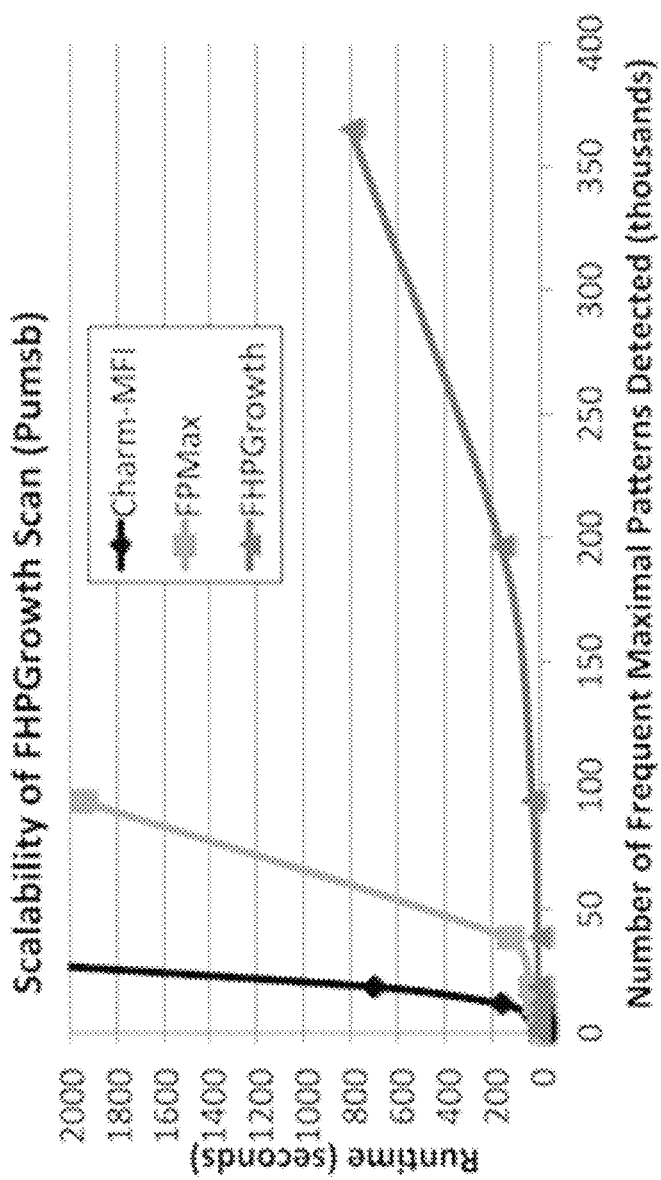
FIG. 27 shows a graphical representation of the pumsb dataset with respect to runtime vs. frequency of maximal patterns detected for various data structures in accordance with an embodiment of the disclosure.

In the next performance comparison, the pumsb dataset is shown in FIG. 26 with respect to runtime vs. minimum support threshold for various data structures. FIG. 27 is a graphical representation of the pumsb dataset with respect to runtime vs. frequency of maximal patterns detected for various data structures.

This dataset contains the most maximal patterns of any dataset considered in this study. Shown in FIG. 26, as the min_support value decreases, FHPGrowth becomes increasingly faster than FPMax and CHARM-MFI. At the 55% support, FHPGrowth is 60× faster than FPMax. CHARM-MFI had performance woes for min_support below 70%, and FPMax becomes significantly slower than FHPGrowth for min_support below 60%. The runtime relative to the number of frequent patterns detected was also considered and shown in FIG. 27. FHPGrowth detected the top one million patterns faster the FPMax could detect the top 500 thousand. This sort of dense dataset is appropriate for the FHPGrowth paradigm.

Figure 28:
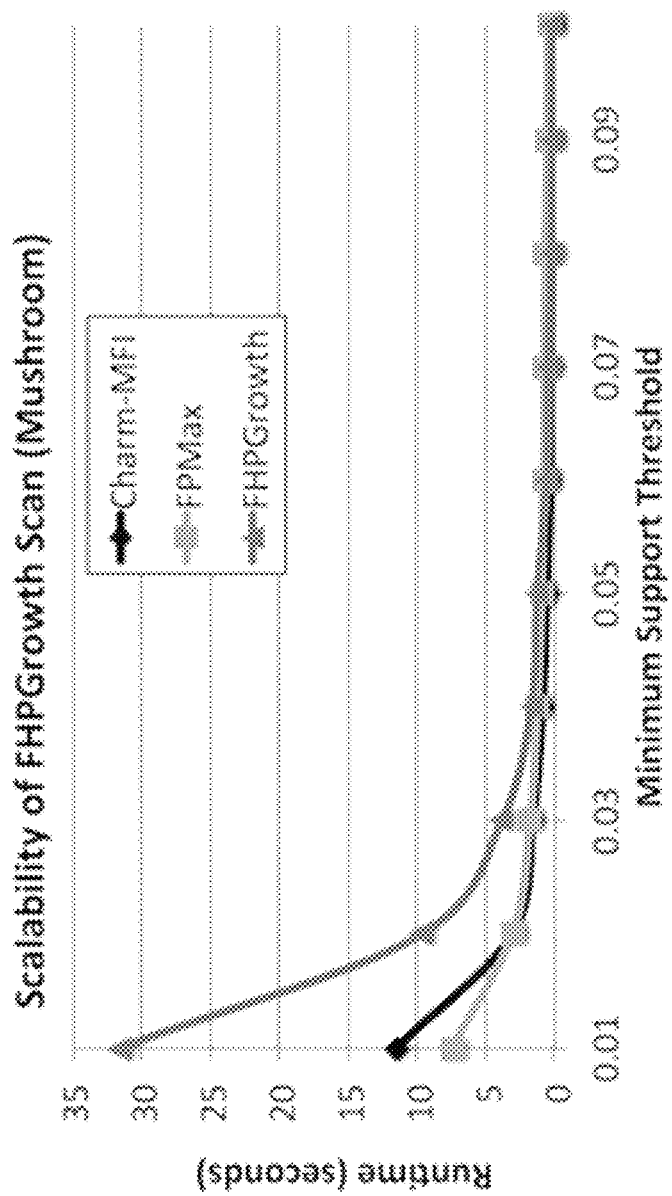
FIG. 28 is a graphical representation of the mushroom dataset with respect to runtime vs. v for various data structures in accordance with an embodiment of the disclosure.

The last dataset considered is mushroom, which is much more sparse in comparison to chess, connect, and pumsb. FIG. 28 is a graphical representation of the mushroom dataset with respect to runtime vs. minimum support threshold for various data structures.

As shown in FIG. 28, FPMax and CHARM-MFI outperform FHPGrowth on this sparse dataset. The FHPTree is not able to effectively make use of the hierarchical node structure, and the performance suffers. That is to say, there are many hierarchical patterns that are candidate frequent but are not frequent.

As a theoretical evaluation of performance and method of reflection, the number of states in a traversal were considered and compare with the ideal case having the minimum number of states required to extract all maximal frequent patterns. A direct traversal from root to pattern of size k may require $O(k*\log(n))$ steps for an FHPTree with n leaves. If there are p patterns of size less than or equal k, then $p*k*\log(n)$ steps may be required. However, the disclosed method does not start at the root before discovering each item. Item detection is a chain of events occurring along the traversal. Moreover, one-off patterns may only be separated by a single state. At this point $p*k*\log(n)$ may begin to seem like a conservative estimate for the minimum number of required steps. Furthermore, since a k-itemset may only require $j \leq k$ nodes, due to the nature of pattern covers in the FHPTree, $p*k*\log(n)$ can be reduce top$*j*\log(n)$. As an example, using the connect dataset, the current FHPGrowth implementation utilizes 378,000 states to discover 2,103 itemsets; the longest itemset consists of 20 items. Assuming all items are of length 20 and utilizing the conservative estimate of $p*k*\log(n)$, the calculation finds 294,420 states could identify all 2,103 itemsets. The scan operation experimental results suggest the FHPTree is efficient and can effectively prune the search space.

Evaluation of the Search Operation Using the Persistent Data Structure

To evaluate the performance of search, the chess dataset was used. In this experiment, the goal was to find the maximal frequent itemsets containing an item of interest. Similar to the scan experiments, the min_support threshold was varied and evaluated based on the effect on runtime.

Figure 29:
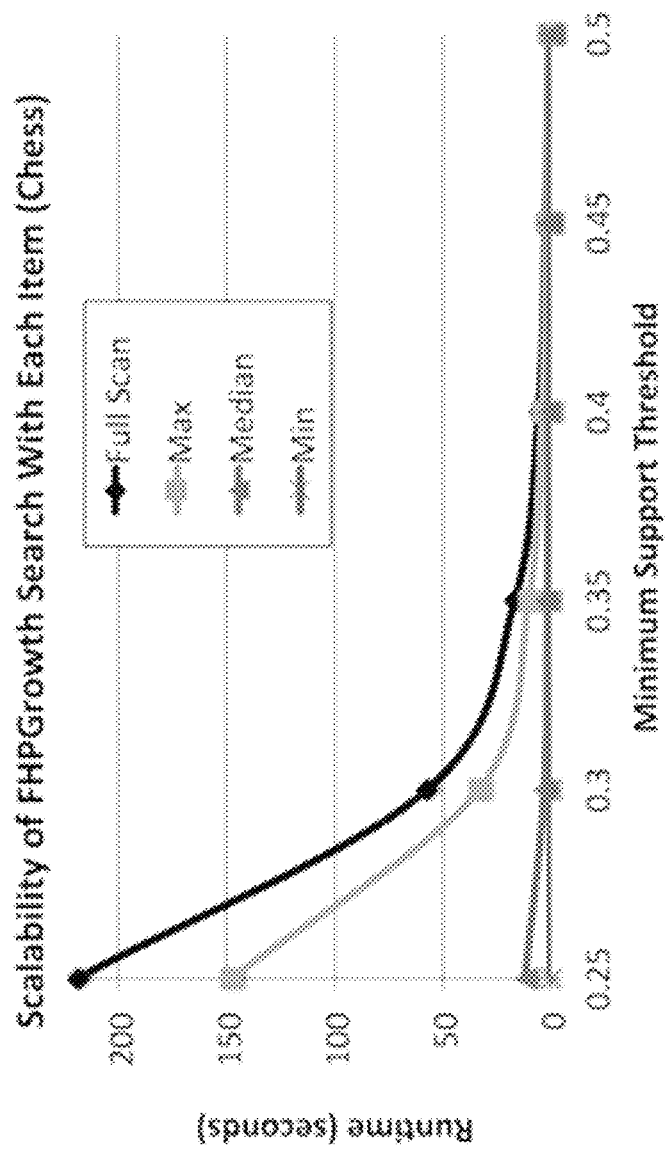
FIG. 29 is a graphical representation of the scalability of the search operation of the persistent data structure in accordance with an embodiment of the disclosure.

As shown in FIG. 29, an overview of the search performance is provided. The number of maximal frequent patterns containing some item x varies significantly for different x. The maximum search time was consistently less than the full scan operation. The median search time at 25% support was 11 seconds, a 20× reduction in runtime compared to the full scan. These results suggest the search approach is favorable to a post-processing technique to identify patterns containing the query item.

Use of Distributed Computing for Frequent Hierarchical Pattern Mining of the Persistent Data Structure By porting the FHPTree to distributed computing environments, the overall scalability is improved. Larger datasets can be processed in parallel with the increased storage capacity, and faster runtimes can be achieved with more cores dedicated to the mining process. Potential options for distributing this method may involve duplicating the FHPTree on many machines and partitioning the workload of FHPGrowth. Another scheme is to partition the FHPTree and distribute the partitions across multiple machines where local FHPGrowth results are acquired and aggregated to identify the global set of frequent patterns.

Since frequent pattern mining is a computationally intensive task, parallelizing FHPGrowth has the potential to improve performance and significantly reduce runtimes. In this way, hardware and computing clusters can be scaled in order to achieve desired performance.

Figure 30:
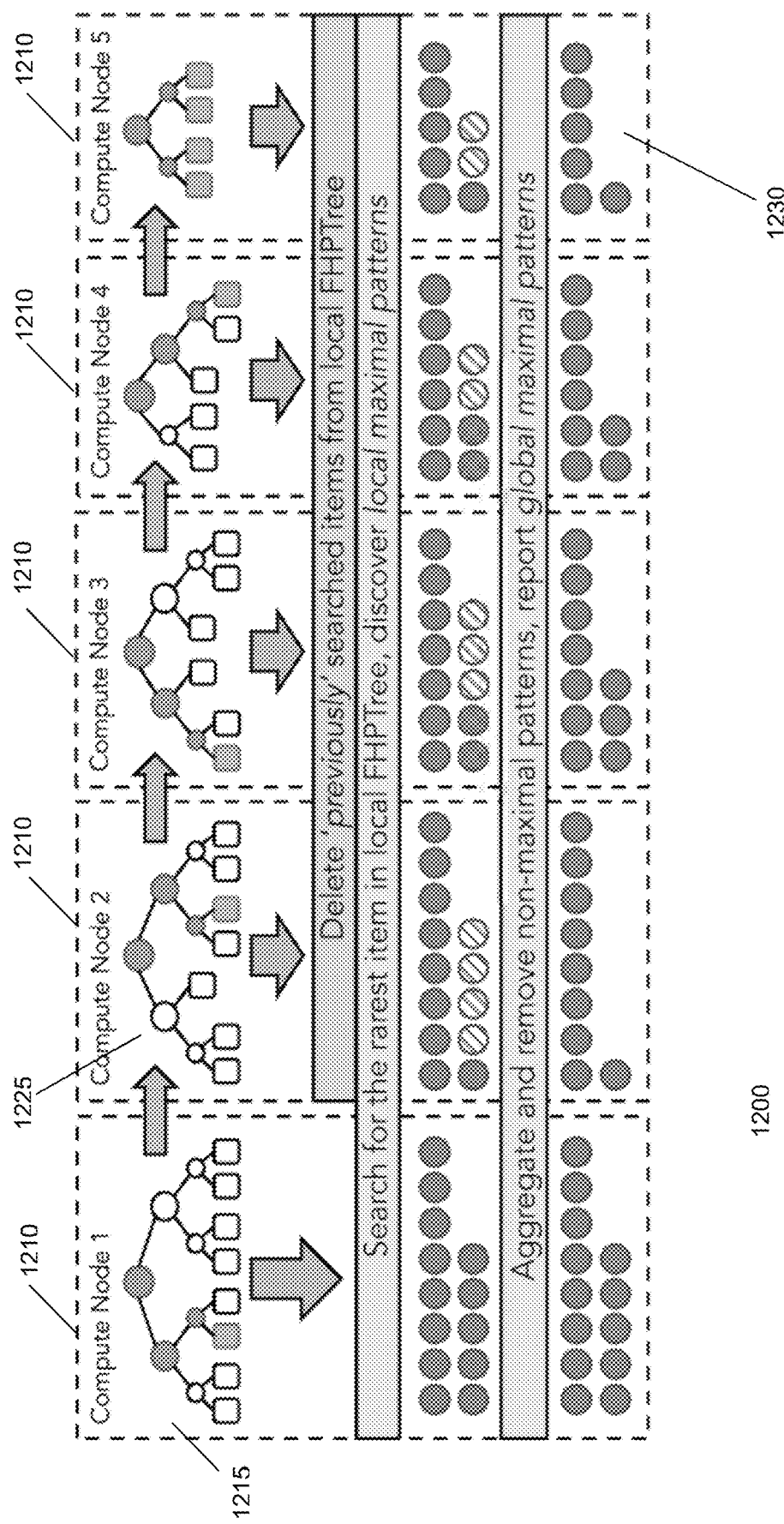
FIG. 30 is an example high level overall architecture of the persistent data structure being employed on a distributed computing system in accordance with an embodiment of the disclosure.

FIG. 30 provides a high level overall architecture of the persistent data structure 200 on a distributed computing architecture 1200. In FIG. 30, a plurality of computer nodes 1210 each execute operations on a constructed tree 1215 of an associated dataset. FIG. 30, shows the search operation being performed serially with each subsequent node to obtain the pattern result. After a search is performed on the rarest item of the constructed tree 1215, a local maximal pattern 1220 is discovered. A search on a subsequent constructed tree 1225 deletes previously search items from the local tree. Once again, local maximal patterns are discovered. The search continues on until each remaining node of the tree construction provides a positive result. The positive results for each node are then aggregated and the non-maximal patterns are removed to report a global maximal pattern 1230.

The first component to consider for distributing the approach is the underlying data structure. When distributing the FHPTree, two choices are possible: duplicate the data structure on each machine, or partition the data structure and distribute the resulting collection of subtrees onto various machines. The traversal scheme of FHPGrowth would not lend itself nicely to the latter as each state may involve many nodes in the tree, which could create significant network overhead. Thus, the data structure should be copied or broadcasted onto each machine of the distributed architecture. It is important to recall that the memory footprint is relatively small for the FHPTree.

Another goal is to define a mechanism for partitioning the FHPGrowth traversal of the persistent data structure 200. This component comprises a majority of the processor workload. To accomplish this, the FHPTree's efficient inclusive search filter is used. By performing a search for each individual item, there is a guarantee to find all maximal frequent patterns. Using this approach, searching would be able to occur for different items on specific CPUs or physical machines, in parallel. Individual search operations are faster than a full scan. Thus, if the computing environment is large enough and all search operations can be performed simultaneously, this distribution technique should provide improves in runtime.

There are a few limitations to this approach. First, searching for an item with high support may take significantly longer than for a low support item. This may cause the distributed workload to become imbalanced, leading to straggler tasks. Second, duplicate patterns will be detected. For example, {A, B, C} will be detected when searching for A, B, and C. The disclosed method ensures a balanced workload and will eliminate discovery of duplicate results.

Use of the Scan Operation of the Persistent Data Structure in Distributed Computing Architecture The scan operation may also be utilized on the distributed architecture 1200. Since the FHPTree is broadcasted to each node, the insert, update, and delete operations remain unchanged from the classic approach on a single computing system. A given operation is performed on the head node of the computer cluster, and the updated FHPTree is broadcasted to all nodes.

Figure 32:
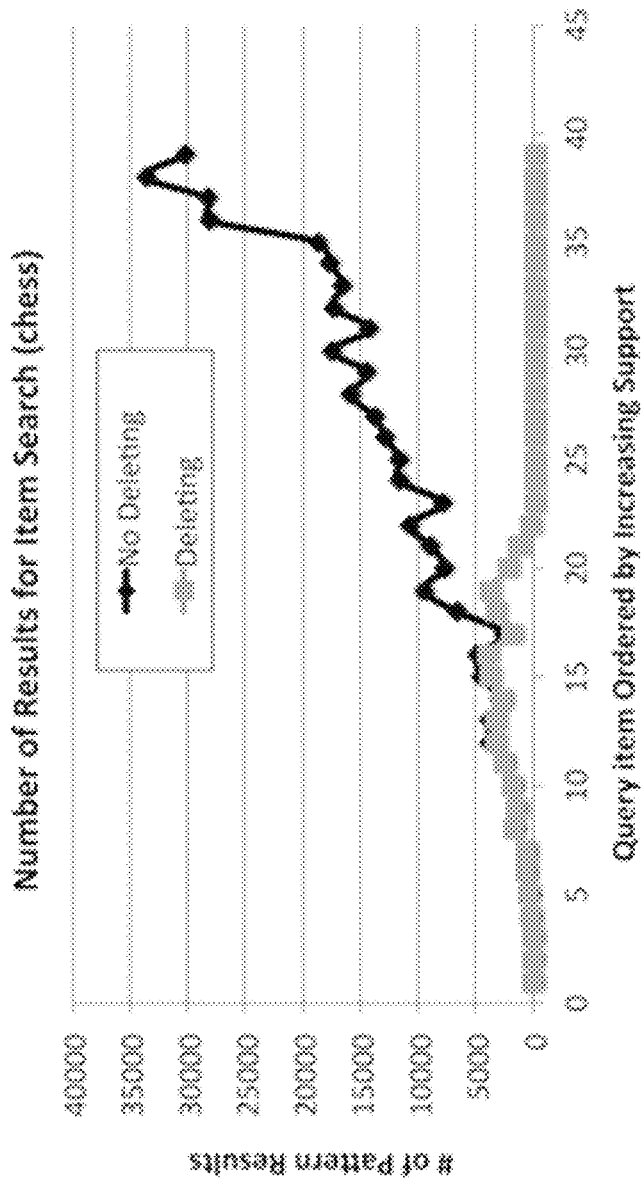
FIG. 32 provides a graphical representation of the number of patterns returned by each search on distributed architecture for the persistent data structure in accordance with an embodiment of the disclosure.

The sequential search strategy is detailed in the pseudo-code of FIG. 31. FIG. 32 provides a visualization of the number of patterns returned by each search. The number of results varies significantly for different query items. Specifically, the items with higher support tend to be involved in more maximal frequent patterns.

To address these concerns, an iterative search and delete process is utilized. The philosophy is that after searching for an item, all the patterns containing said item are obtained, and thus, that item may be deleted after the search. In addition, a classic strategy in query optimization is to evaluate the most selective query condition first. Similarly, a search for the least frequent item may be completed first since they execute the fastest. Then, the item is deleted, and the next least frequent item is searched. This process is continued until the tree is empty. This iterative search and delete technique is a serial process. However, the method is parallelized by precomputing the necessary delete operations associated with each query item and distributing the corresponding instructions to appropriate machines in the cluster.

Queries may be subsequent or occurring after other queries. If query A occurs "after" query B, this simply states that A will be deleted from the tree before searching for B. As a result, searching for A and searching for B become independent operations. In general, for any query $Q_1$ that occurs before another query $Q_2$, the items contained in $Q_1$ will be deleted from the FHPTree before searching for $Q_2$. From this point forward, reference to this sequential search and delete strategy as the SD (search and delete) approach detailed in the FIG. 33 pseudocode algorithm.

By deleting from the FHPTree, the most frequent items are contained in progressively smaller trees. Items that previously took the longest become the fastest. FIG. 33 demonstrates the reduction in results for the highest support items achieved by this technique. Although, this technique has a significant impact on workload distribution and reducing redundant computation, both issues remain. Now the first 50% of items, when sorted in ascending order by support, take on the burden of retrieving the most results, and some non-maximal patterns are detected due to item deletion. Another point to notice, there is a long tail effect. At a certain point, all patterns have been detected and subsequent queries do not return any patterns.

As for workload balancing, conceptually, these expensive search queries need to be split into a collection of more selective queries that yield equivalent results. Those new queries could then be executed on various CPUs or computer nodes, effectively distributing the burden of the initially expensive query. For example, if the search for A yields too many results, searching for {A, B}, {A, C}, and {A, D} separately may partition this burden. These secondary items are also searched for in order of increasing support, so the most selective query is evaluated first. Secondary items are also deleted after searching. That is, after searching for {A, B}, B is deleted, so the search for {A, C} will not return any patterns containing B. Each node in item A's corresponding FHPTree is a secondary query item to ensure all patterns involving A have been detected.

Operating the persistent data structure 200 on a distributed computing architecture 1200 may require removal of non-maximal patterns from the results. Removing subsets can be a computationally intensive process. The naive approach is to perform an all-against-all comparison between the resulting patterns, and remove those that occur as a subset. That approach is expensive, scaling as $O(n^2)$. The number of non-maximal patterns is linearly dependent on the number of maximal patterns, and these subsets follow a predictable pattern. For example, suppose {A, B, C} is detected when searching for A. Then, {B, C} may be detected when subsequently searching for B. For each pattern P detected when searching for A, an anti-pattern P-A is generated and designed to negate the subsets detected during subsequent searches. In the final aggregation of the pattern results, these anti-patterns will negate and eliminate their non-maximal counterpart, and as a result, only maximal patterns will remain.

In the cases where secondary items are utilized in the query, the deletion logic becomes slightly more complex. Suppose a search is run for {A, B}, and discover the maximal pattern {A, B, C, D}. After deleting the secondary item B and searching for {A, C}, the pattern {A, C, D} will be detected. After all of A's secondary items are exhausted, A is deleted from the FHPTree and B is searched. At this time, {B, C, D} will be detected. Given that {A, B, C, D} was detected while searching for {A, B}, anti-patterns can be created with {A, B, C, D}-B and {A, B, C, D}-A. To generalize, if K is a collection of items in the query, and P is a pattern detected, P-$k_i$ is a subset that may be detected by subsequent searches for all $k_i \in K$.

Using the above discussed algorithms, a long tail of queries may be produced and should be removed. The long tail can be viewed in early figures and refers to the collection of queries that are unnecessary because they do not return any results. The results for these queries have already been covered by previous search operations. To account for this, the persistent data structure 200 only evaluates the first k % of queries. There is a chance that the last (1-k) % of queries contain novel pattern results. Therefore, the persistent data structure 200 can construct one final query that covers the (1-k) % that have been discarded. In this way, comprehensive results are guaranteed while consolidating many unnecessary operations.

For example, let {A, B, C, D, E, F} be the query items sorted in ascending order based on support. Suppose the first 50% of queries are evaluated. {A, B, C} is searched using the SD approach. The remaining nodes {D, E, F} are searched by performing a full scan on the FHPTree containing only D, E, and F.

This long tail effect also presents itself after a query is slit into a collection of more selective queries. For example, let A be a query that is split into a collection of more selective queries. Let {(A, B), (A, C), (A, D), (A, E), (A, F)} be the collection of queries sorted in ascending order based on support. If the last 50% are discarded, the query is left with {(A, B), (A, C), (A, D)}. The covering query would be a search for item A, on the FHPTree containing {A, E, F}. If any remaining patterns contain (A, E) or (A, F), will be detected by this covering query. In general, for a query Q that is split into a collection CQ, the covering query involves searching for Q on the FHPTree containing all items in Q and the long tail removed from QC.

Use of the Search Operation of the Persistent Data Structure in Distributed Computing Architecture A useful technique in frequent pattern mining is having the ability to execute targeted data mining tasks. That is to say, a user would like to find all maximal frequent patterns that contain a collection of items of interest. Similar to the classic FHPGrowth approach, the distributed search utilizes the same logic as the distributed scan. However, rather than querying all items, a collection of queries are generated that include the items of interest. FIG. 34 shows the pseudocode algorithm that demonstrates the search operation on distributed architecture.

An example of the collection of queries are provided which are generated for a specific search. Let {A, B, C, D, E, F} be the set of all items, and let A be the search item. The set of queries generated are {(A, B), (A, C), (A, D), (A, E), (A, F)}. After removing the long tail, the resulting set of queries may be {(A, B), (A, C), (A, D), A}, where the singleton A is the covering query.

Examples and Evaluation of the Persistent Data Structure (FHPTree and FHPGrowth) in a Distributed Computing Architecture Tests were run to evaluate the efficiency of the distributed FHPGrowth in terms of the search and scan operations. These tests were compared against the results of the single node implementation of FHPGrowth detailed previously.

Additionally, results were compared with a single node implementation that utilizes the SD (search and delete) approach.

These example experiments, use the four datasets described earlier: chess, chainstore, connect, and pumsb. Chess and chainstore are classic datasets commonly used for benchmarking frequent pattern mining algorithms. Chess consists of 75 distinct items across 3196 transaction that have an average size of 37 items. Chainstore contains digital customer transactions from a retail store. There are roughly 46,000 distinct items, 1.1 million transactions, and each transaction has an average size of seven items. Connect is composed of spacial information collected from the connect-4 game. This data contains 67,557 transactions and 129 distinct items. Pumsb consists of census data for population and housing. It is composed of 49,000 transactions with more than 2,100 distinct items. All experiments are conducted on a distributed computing cluster consisting of 8 nodes, each with 8 CPU cores and 120 GB of RAM.

The goal of the horizontal scalability experiment was to demonstrate the performance gains associated with increasing computing resources. In this experiment, the chess dataset at 15% support was considered and the number of compute nodes in the cluster was varied from 1 to 8 and report the runtime for the scan operation.

Figure 35:
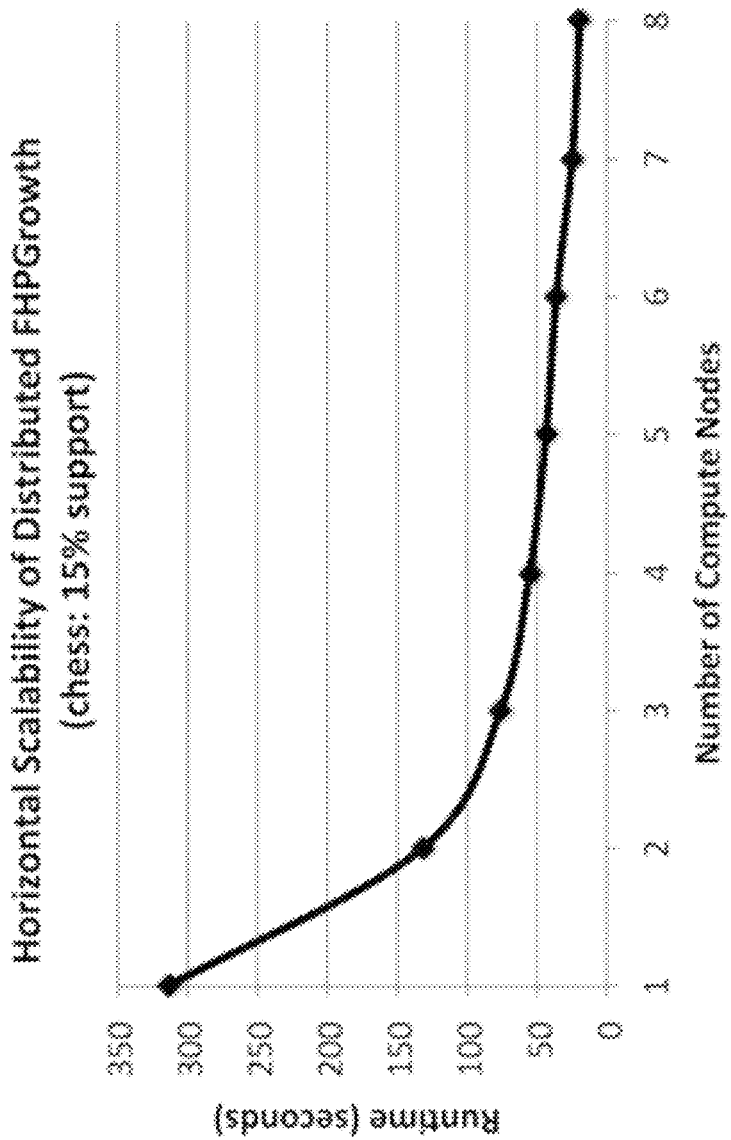
FIG. 35 is a graphical representation of the horizontal scalability of the persistent data structure on distributed architecture in accordance with an embodiment of the disclosure.

Shown in FIG. 35 is the horizontal scalability of the persistent data structure 200 on distributed architecture. As the number of nodes increases, the runtime decreases. For this dataset, the workload distribution is balanced, so there is an 8× speed up when comparing the 8 node cluster to the single node execution.

Figure 36:
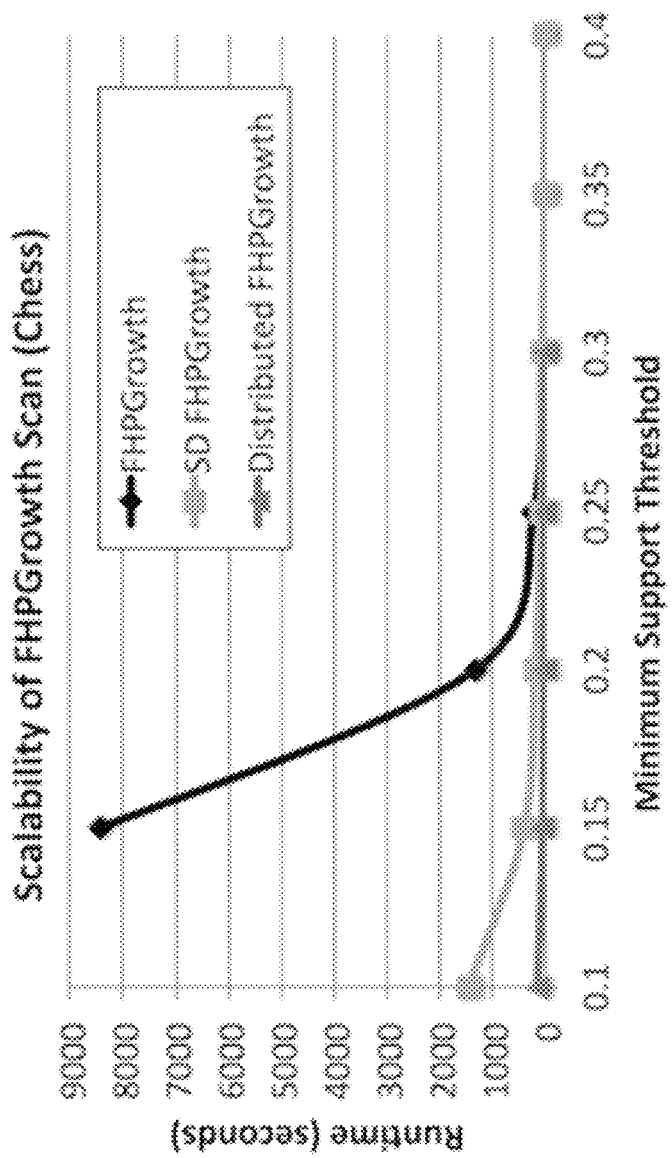
FIG. 36 is a graphical representation of the scalability of the chess dataset in a runtime vs. min_support threshold for FHPGrowth, SD (search and delete) FHPGrowth, and Distributed FHPGrowth in accordance with an embodiment of the disclosure.
Figure 37:
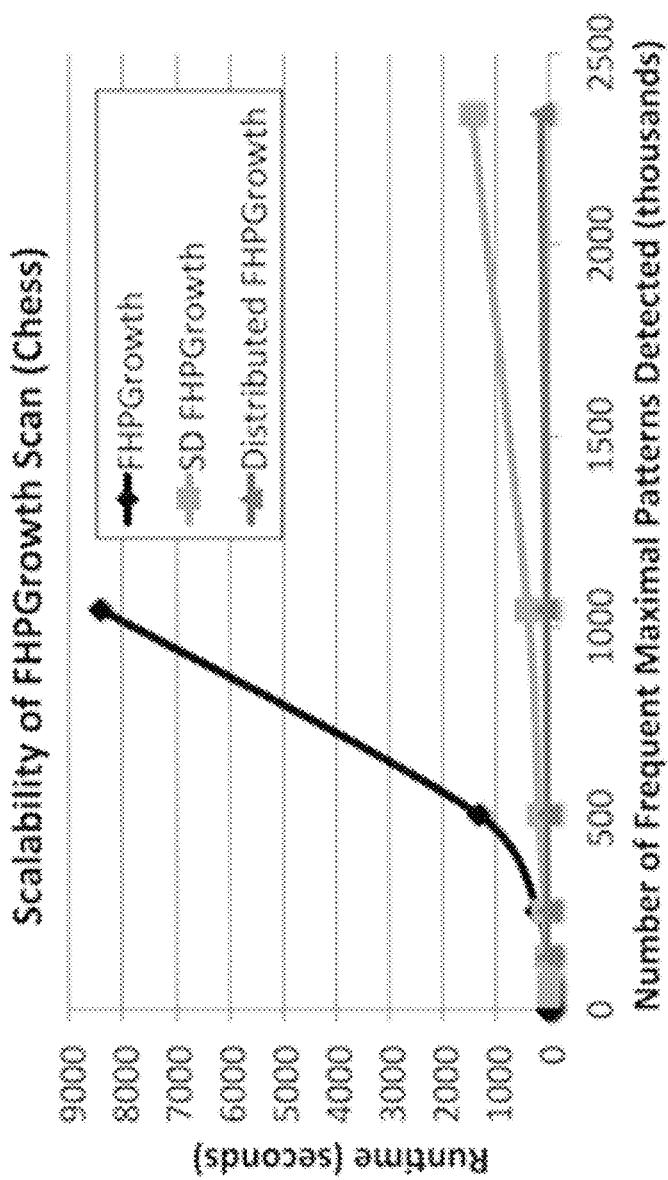
FIG. 37 a graphical representation of the scalability of the chess dataset in a runtime vs. frequent maximal patterns detected for FHPGrowth, SD (search and delete) FHPGrowth, and Distributed FHPGrowth in accordance with an embodiment of the disclosure.

Evaluation of the Scan Operation of the Persistent Data Structure in Distributed Computing Architecture The next experiment was mining all maximal frequent patterns from the chess dataset. FIG. 36 characterizes the runtime relative to the min_support threshold. The improvements offered by the SD process are significant. For minimum support thresholds greater than 35%, the SD approach is the slowest, nearly 2× slower than the original FHP-Growth. Below 35%, the improvement becomes significant, offering a 20× speedup at min_support=15%. The distributed approach consistently offers approximately 8× speedup over the SD approach, and thus, is roughly 160× faster than the original FHPGrowth. FIG. 36 shows the scalability of the chess dataset in a runtime vs. minimum support threshold for FHPGrowth, SD (search and delete) FHPGrowth, and Distributed FHPGrowth. FIG. 37 shows the scalability of the chess dataset in a runtime vs. frequent maximal patterns detected for FHPGrowth, SD (search and delete) FHPGrowth, and Distributed FHPGrowth.

As the number of patterns increases, the SD approach is more efficient. FIG. 37 demonstrates this concept.

Figure 38:
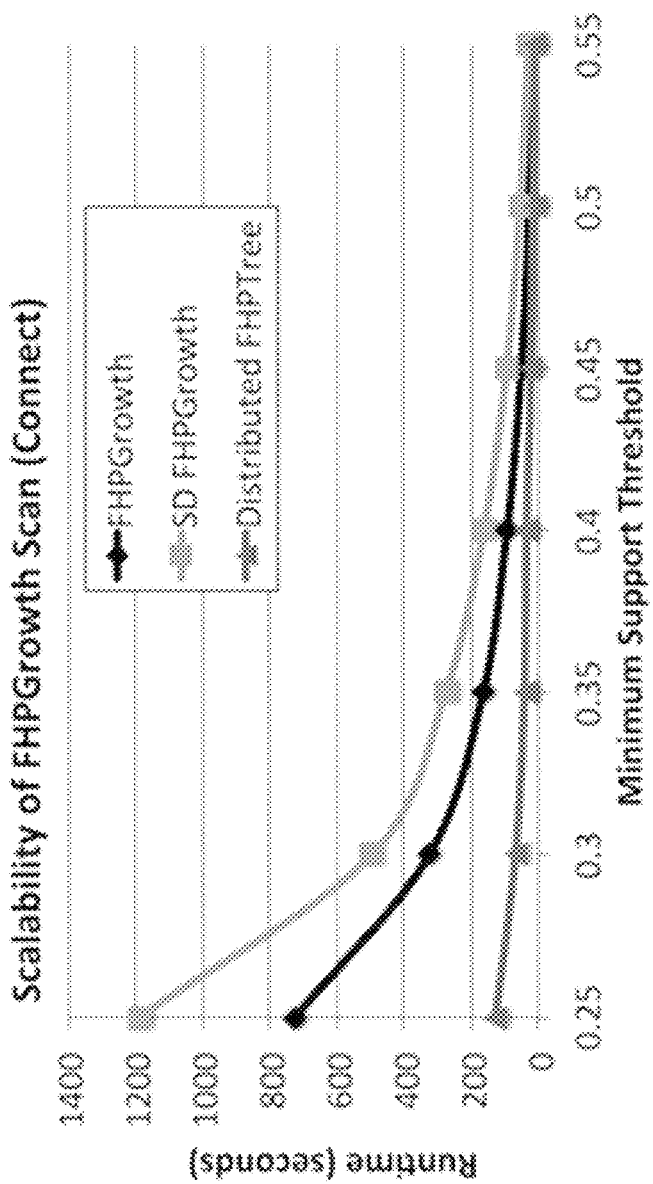
FIG. 38 is a graphical representation of the scalability of the connect dataset in a runtime vs. min_support threshold for FHPGrowth, SD (search and delete) FHPGrowth, and Distributed FHPGrowth in accordance with an embodiment of the disclosure.

In this next performance comparison, the connect dataset is utilized. In contrast to the previous results, the SD approach is 2× slower than the original FHPGrowth. This may seem contradictory; however, it is aligned with the previous results at high minimum support thresholds. FIG. 38 shows these results.

Figure 39:
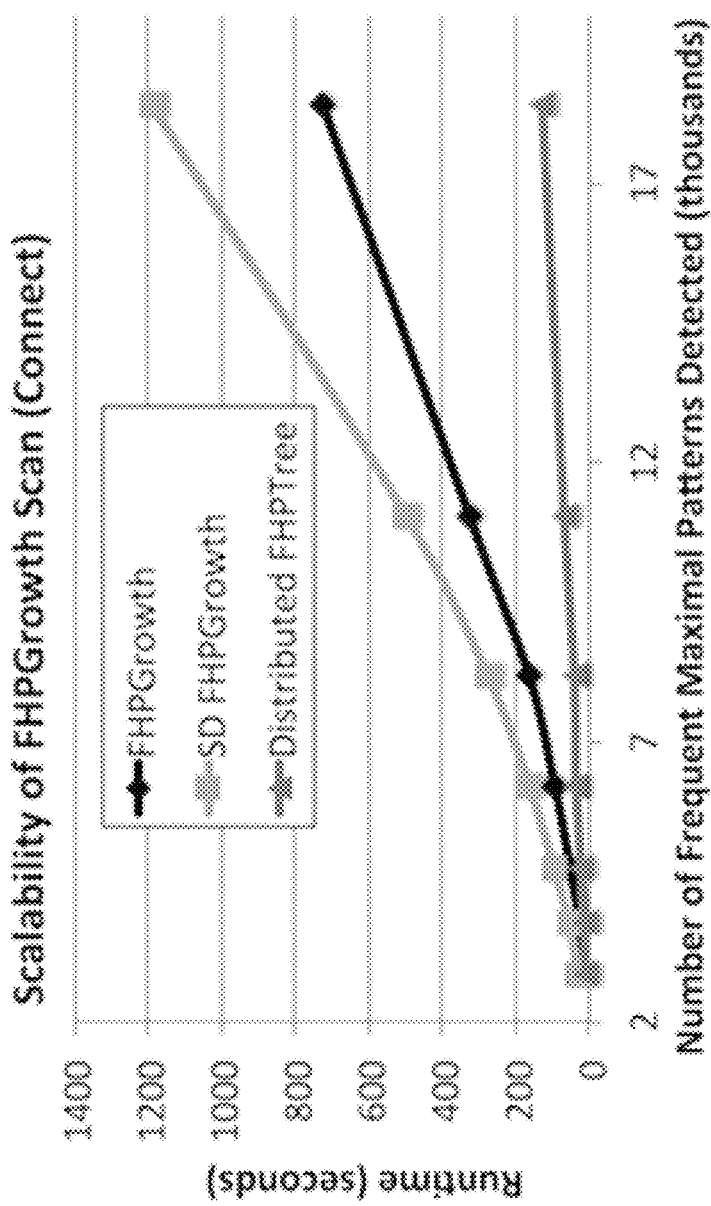
FIG. 39 a graphical representation of the scalability of the connect dataset in a runtime vs. frequent maximal patterns detected for FHPGrowth, SD (search and delete) FHPGrowth, and Distributed FHPGrowth in accordance with an embodiment of the disclosure.

The number of results for this dataset is far less than that of chess; at 25% support, there are roughly 18,000 results. As a result, the overhead of the SD process makes it less efficient in this scenario. FIG. 39 provides more detail about the runtime performance of the connect dataset relative to the number of maximal patterns.

Figure 40:
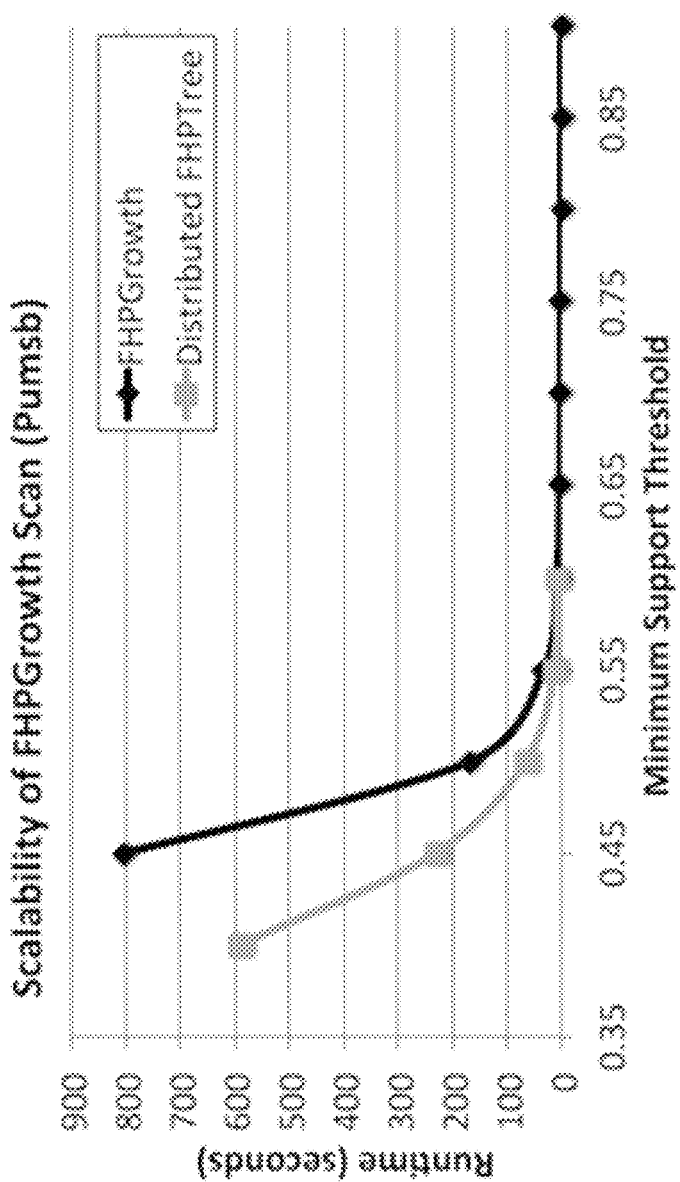
FIG. 40 is a graphical representation of the scalability of the pumsb dataset in a runtime vs. min_support threshold for FHPGrowth, SD (search and delete) FHPGrowth, and Distributed FHPGrowth in accordance with an embodiment of the disclosure.

Next, the pumsb dataset was utilized to evaluate performance. The FHPTree is efficient on this dataset. In previous work, it was demonstrated to be a 60× speedup over the classic approaches, FPMax and Charm-MFI. As shown in FIG. 40, the SD approach offers a 4× speedup over the original FHPGrowth, and the distributed approach achieved a 3× speedup over the SD approach.

Figure 41:
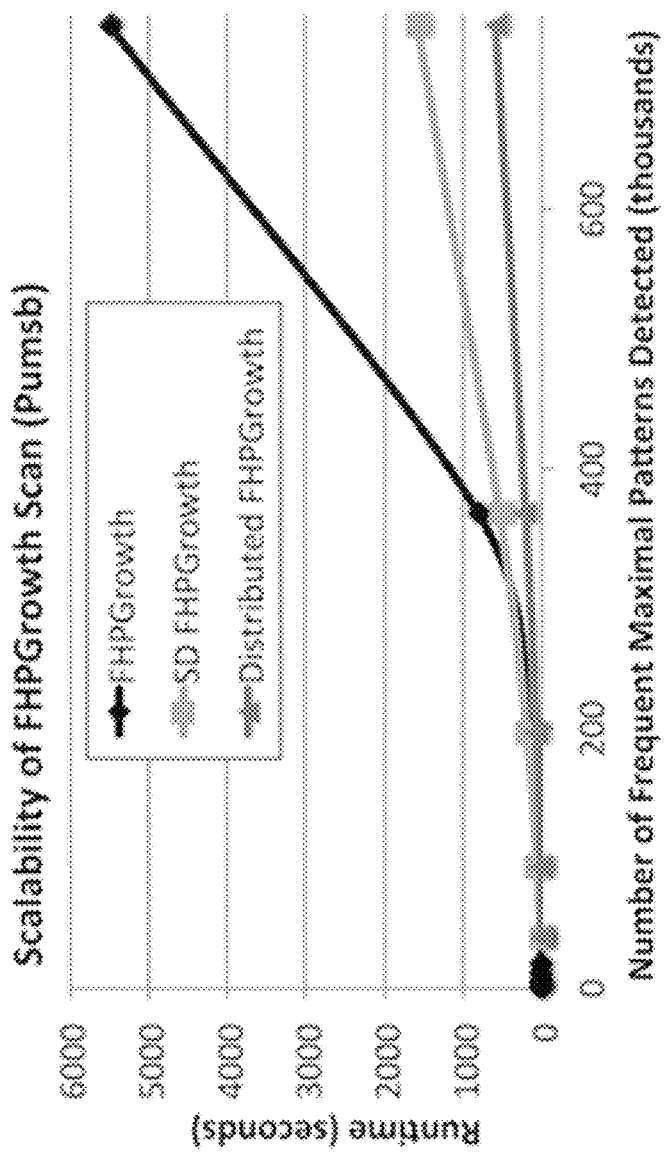
FIG. 41 a graphical representation of the scalability of the pumsb dataset in a runtime vs. frequent maximal patterns detected for FHPGrowth, SD (search and delete) FHP-Growth, and Distributed FHPGrowth in accordance with an embodiment of the disclosure.

When considering the number of maximal patterns detected, FIG. 41 shows a similar trend compared to the chess dataset. When there are hundreds of thousands of maximal patterns detected, the SD approach is faster than the original FHPGrowth. Since the distributed approach achieves a 3× speedup, rather than 8, it is known that the workload distribution was not perfectly balanced.

Figure 42:
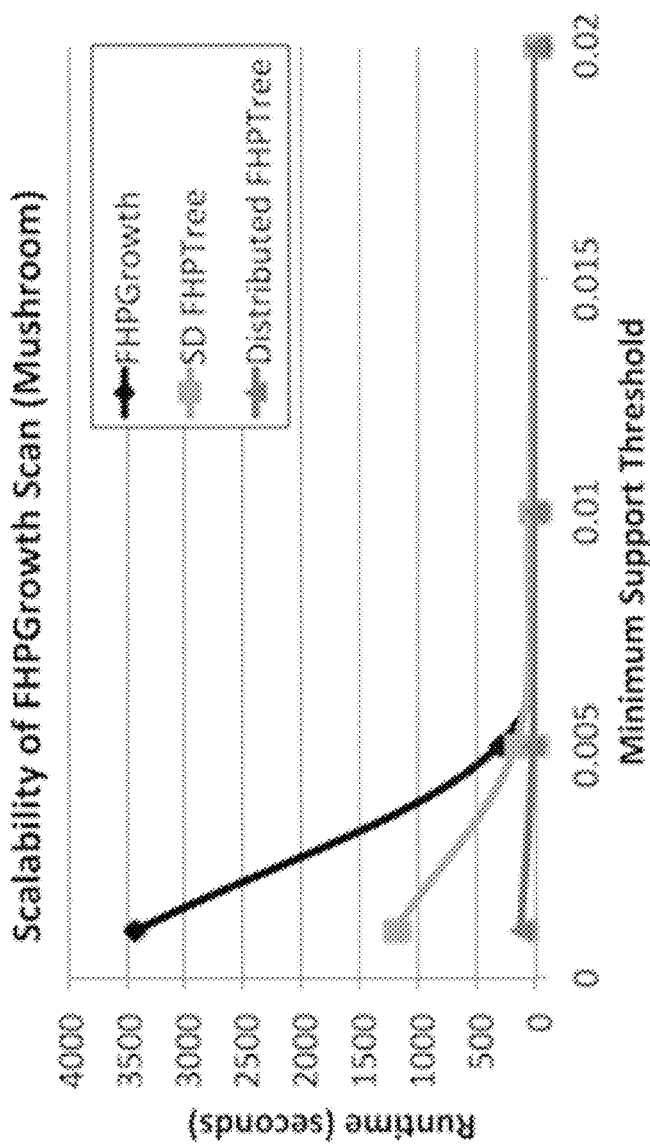
FIG. 42 is a graphical representation of the scalability of the mushroom dataset in a runtime vs. min_support threshold for FHPGrowth, SD (search and delete) FHPGrowth, and Distributed FHPGrowth in accordance with an embodiment of the disclosure.
Figure 43:
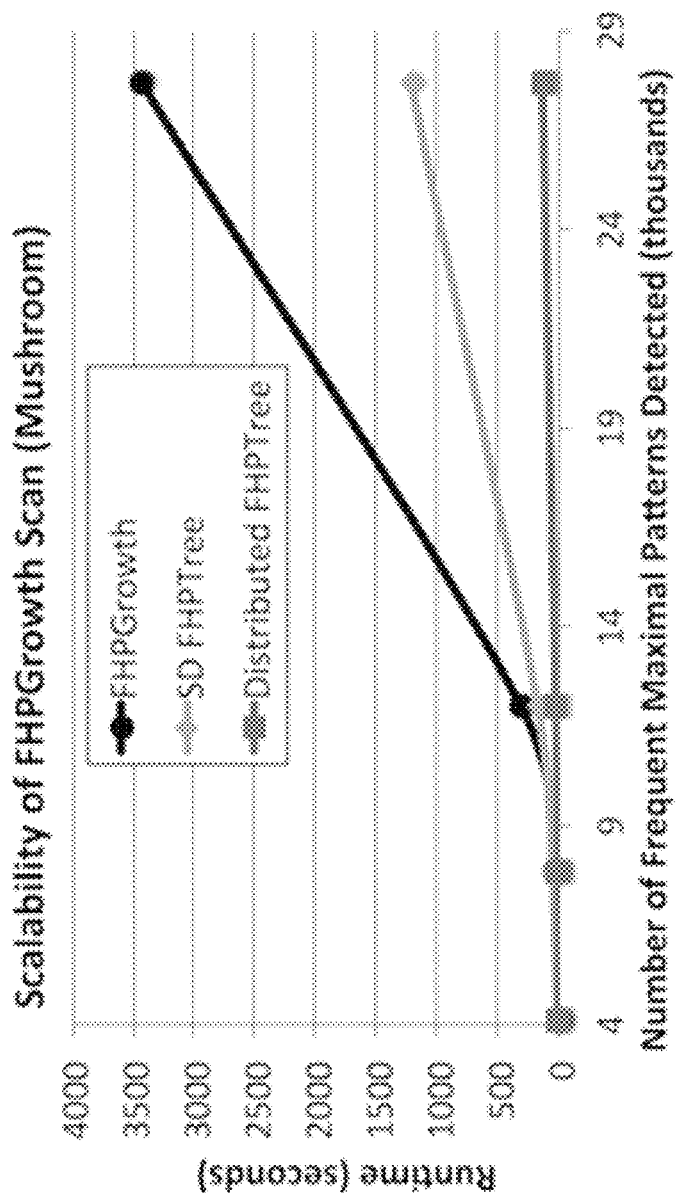
FIG. 43 a graphical representation of the scalability of the mushroom dataset in a runtime vs. frequent maximal patterns detected for FHPGrowth, SD (search and delete) FHPGrowth, and Distributed FHPGrowth in accordance with an embodiment of the disclosure.

The final dataset considered was mushroom, which is much more sparse in comparison to chess, connect, and pumsb. As a result, the original FHPTree was not efficient. This is because many traversal paths lead to patterns that do not meet the minimum support threshold. The SD approach is able to significantly reduce this effect, offering a 3× speedup for min_support <0:5%. The distributed approach consistently offered an 8× speedup over the SD approach. FIGS. 42 and 43 show the results from evaluating the mushroom dataset in the distributed computing architecture.

Evaluation of the Search Operation of the Persistent Data Structure in Distributed Computing Architecture Finally, the performance of the distributed search operation was evaluated using the chess dataset. In this experiment, the goal was to find the maximal frequent itemsets containing an item of interest. Since the search time varies significantly for different items, consideration of the maximum, minimum, and median runtimes when characterizing the performance.

Figure 44:
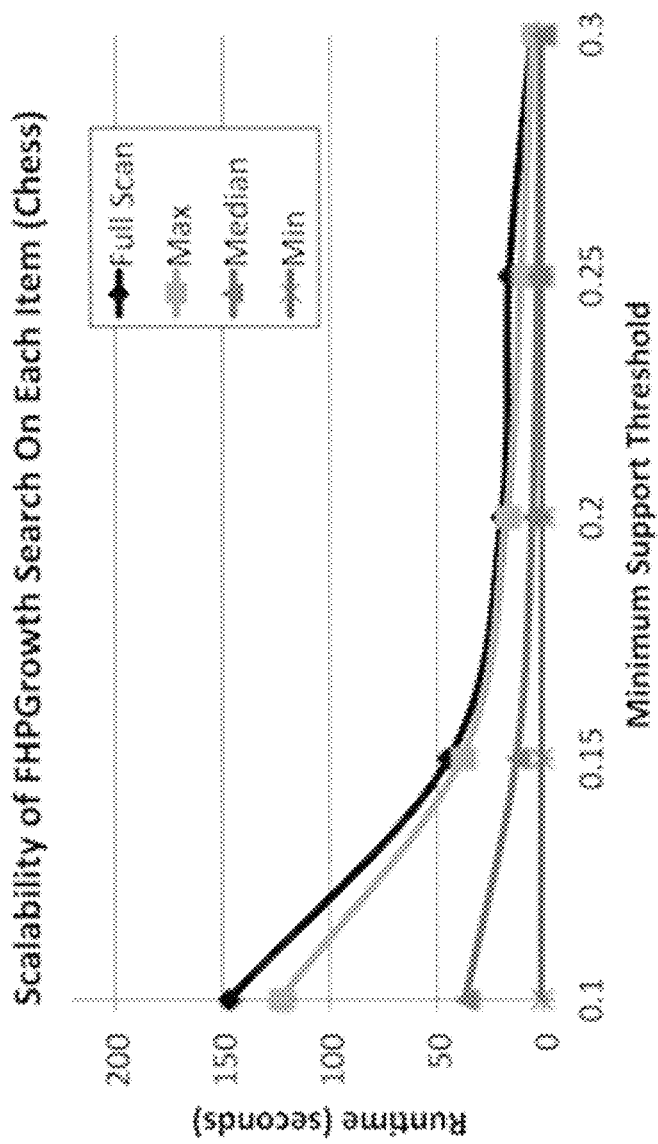
FIG. 44 is a graphical representation for a search operation on distributed architecture for the persistent data structure in accordance with an embodiment of the disclosure.

As shown in FIG. 44, the maximum time taken during search is always less than that of the full scan. This is intuitive as there are fewer results returned in a targeted search. The median search time is consistently more than 4× faster than the full scan. The minimum runtime will be achieved when searching for the rarest items. These rarest items took less than 1 second for all minimum support thresholds tested, and at min_support=10%, this search returns thousands of maximal patterns. These results are consistent with that of the single server approach shown earlier in this disclosure.

The above disclosure shows a new persistent data structure, FHPTree and FHPGrowth, which can be constructed as a tree and traversed by a search and scan to determine maximal pattern frequencies and faster speed and greater accuracy that existing data structures. The FHPTree is the persistent, dynamic data structure at the core of this paradigm and provides targeted search capabilities that were previously not possible using classic approaches. FHPGrowth is the top-down traversal algorithm that offer significant improvements over the classic approaches and lends itself well to distributed computing environments. This disclosure also offered a distributed FHPGrowth technique that offered significant runtime improvements over the single server solution.

The FHPTree is a hierarchical cluster tree of items, and FHPGrowth is a top-down mining scheme for extracting frequent patterns. The number of nodes required for the FHPTree scales linearly as the number of distinct items. Furthermore, a 10-fold reduction in the memory footprint may be achieved over the FPTree. In addition, for reoccurring pattern mining analyses, utilizing a persistent data structure reduces redundant computation. Since the FHPTree supports insert, update, and delete operations, it is not necessary to continually rebuild before each analysis or when the transaction database is updated. FHPGrowth was competitive when compared to existing state-of-the-art approaches, CHARM-MFI and FPMax. FHPGrowth outperformed both approaches on dense datasets, achieving up to a 60-fold reduction in runtime. In addition, the search operation enables targeted pattern mining analyses to be conducted efficiently. The median runtime for search was a dramatic reduction in runtime compared to a full scan.

An iterative search and delete process for the FHPGrowth algorithm offered up to a 20× speed up over the original FHPGrowth approach in a single server environment. Parallelize FHPGrowth traversal may be used, porting the technology to distributed computing environments The distributed computing extension consistently outperformed the single node implementations by notable margins. Example experiments demonstrated that an 8 node computing cluster with a balanced workload can achieve up to an 8× speed up over the single server environment. In total, the improvements offered up to a 160× speedup over the original FHPGrowth algorithm and a 2400× speedup over the classic FPMax.

The persistent data structure 200 presents a targeted search feature that is offered by the FHPTree. The ability to target broad or specific regions of the search space allows efficient retrieval of relevant information. Moreover, a strategy to partition the original traversal into a collection of more efficient traversals is an effective strategy for evaluation. Those traversals can be parallelized and distributed across multicore and cluster computing environments.

The persistent data structure 200 is the Frequent Hierarchical Pattern Mining paradigm. Classic data structures used for frequent pattern mining were not well suited to serve as persistent, dynamic indexes for frequent pattern data, as they do not provide targeted search capabilities like FHPGrowth can. The frequent hierarchical pattern mining paradigm may serve as a catalyst for deep, targeted associative mining analyses. The FHPTree achieves massive performance improvements over state-of-the-art approaches, and the memory footprint is smaller than existing data structures. The persistent data structure may be implemented a variety of useful applications for the FHPTree paradigm.

In one possible industrial application, the persistent data structure 200 may be used in a biological application of frequent pattern mining. It may be used to extract repetitive DNA sequences from massive genomic sequence datasets using the Apache Hadoop MapReduce distributed computing framework. Applications of contrast mining in the medical domains may also be possible with the persistent data structure.

Additionally, the persistent data structure 200 may be use as a tool for market basket analysis. Every time a customer checkouts at the grocery store, barcodes are scanned and data is logged somewhere. This information is stored in a transactional format, and has a direct correlation to the consumer. When leveraged with data mining, this can be incredibly useful for marketing. For example, if the store knows that most customers that buy bread also buy milk, the products could be physically relocated to be closer to reduce store congestion or further apart to increase the amount of time browsing in the store. This is one simple example for the usage of this associative product information.

The persistent data structure 200 may also be used as a tool to evaluate electronic medical records. With the technological shift in healthcare, options for data mining drive personalized medicine are becoming possible. Electronic medical records are tracking vast amounts of information from patient demographics to morbidities. This information can be used to learn common trends and associations between demographics, diseases, and health outcomes. For example, If one has high blood pressure and a genetic history of heart disease, what is the likelihood of cardiac arrest? Having the ability to answer questions such as this could dramatically improve health outcomes on a global level.

The persistent data structure 200 may also be used as a tool to evaluate bioinformatics and genomics information. Biologists have been working to answer questions such as "What are commonalities between the genetic information in humans, mice, or other animals", for decades. And furthermore, "Can this genetic correlation tell us more about the evolutionary timeline of Earth?" Information about phylogeny can be drawn from direct association between DNA sequence data. Stronger associations could suggest stronger evolutionary relationships. This is a simple example of how the concept of frequent pattern mining can be used to uncover information about our evolutionary history.

Furthermore, the persistent data structure 200 may also be used as a tool to evaluate stock market information. This technology could be used to analyze statistics in stock market trends a well. For example, correlations between companies might exist such that if the value of one stock shifts, the value of another could be affected. In this way, recommendations could be made to investors based on the status 3rd party stocks.

Also, The persistent data structure 200 may be used as a tool to evaluate web log analytics. Recommendation systems are commonplace on the Internet today. Online giants like Netflix, Amazon, and Google are constantly analyzing user access patterns and making recommendations based on what others like you have done in the past. In the case of Netflix, after watching a movie, the system suggests other similar movies. How does Netflix know which movies are most similar? Movies are annotated with genres, casts, directors, release dates, and listings for users that have watched previously. This information can be used to identify correlations between movies and used as guidelines for recommendations.

The embodiments and examples were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A method of building a tree structure to support efficient mining of frequent patterns with respect to a data set, the method comprising:
 a processor scanning a data set, the data set comprising a plurality of items arranged as a plurality of transactions, wherein the scanning comprises the processor identifying each item that appears in the data set with at least a minimum frequency;
 a processor creating a plurality of leaf nodes for a hierarchical tree structure based on the identified items such that each leaf node corresponds to a different identified item, and wherein each leaf node is associated with the transactions from the data set that have the corresponding item as a member; and a processor creating a plurality of higher level intermediate nodes for the hierarchical tree structure based on agglomerative clustering that builds out the hierarchical tree structure from the leaf nodes upward such that (1) each intermediate node has a plurality of child nodes, wherein the child nodes are non-overlapping with respect to their corresponding items, (2) each intermediate node corresponds to the items that correspond to its child nodes, (3) each intermediate node is associated with a transaction set corresponding to the transactions associated with the corresponding items of its child nodes, and (4) a similarity measure between child nodes and a corresponding threshold is used to identify child nodes that are grouped as sibling nodes under an intermediate node, wherein the similarity measure measures a similarity with respect to the corresponding transaction sets of the child nodes.

2. The method of claim 1 wherein the creating step for creating the plurality of higher level intermediate nodes is performed recursively for a plurality of levels of intermediate nodes within the hierarchical tree structure.

3. The method of claim 1 wherein the creating step for creating the plurality of higher level intermediate nodes further comprises:

a processor computing a similarity index between the transaction sets corresponding to the child nodes to determine the similarity measure.

4. The method of claim 3 wherein the similarity index comprises a Jaccaard Index.

5. The method of claim 1 further comprising:

a processor detecting a new item in the data set that satisfies the minimum frequency;

in response to the detecting, a processor (1) performing a top down insertion of a new leaf node into the hierarchical tree structure, the new leaf node corresponding to the new item, and (2) adjusting the transactions associated with at least one of the intermediate nodes based on the top down insertion.

6. The method of claim 1 further comprising:

modifying the hierarchical tree structure in response to at least one of (1) a new transaction being added to the data set, (2) a transaction being removed from the data set, and (3) a label change for a node of the hierarchical tree structure.

7. The method of claim 1 further comprising:

a processor detecting a deletion of an item from the data set;

in response to the detecting, a processor (1) performing a bottom up deletion of the leaf node corresponding to the deleted item, and (2) adjusting the child node relationship of at least one of the intermediate nodes based on the bottom up deletion.

8. The method of claim 1, wherein the identified items of the data set appear as a candidate transaction set for each respective node, the candidate transaction set for the respective node representing possible identified items appearing in the respective node and any child nodes branching from the respective node.

9. The method of claim 1, wherein the identified items of the data set appear as an exact transaction set for each respective node, the exact transaction set for the respective node representing exact identified items appearing in the respective node as well as any child nodes branching from the respective node.

10. The method of claim 1 further comprising:

a processor scanning the hierarchical tree structure to find all item patterns in the transactions that have a frequency above a defined value.

11. The method of claim 1 further comprising:

a processor searching the hierarchical tree structure to find all item patterns that include a query item.

12. A computer system for building a tree structure to support efficient mining of frequent patterns with respect to a data set, the system comprising:

a processor; and a memory; and wherein the processor is configured to:

scan a data set, the data set comprising a plurality of items arranged as a plurality of transactions, wherein the scan identifies each item that appears in the data set with at least a minimum frequency;

create a plurality of leaf nodes for a hierarchical tree structure stored in the memory based on the identified items such that each leaf node corresponds to a different identified item, and wherein each leaf node is associated with the transactions from the data set that have the corresponding item as a member; and create a plurality of higher level intermediate nodes for the hierarchical tree structure based on agglomerative clustering that builds out the hierarchical tree structure from the leaf nodes upward such that (1) each intermediate node has a plurality of child nodes, wherein the child nodes are non-overlapping with respect to their corresponding items, (2) each intermediate node corresponds to the items that correspond to its child nodes, (3) each intermediate node is associated with a transaction set corresponding to the transactions associated with the corresponding items of its child nodes, and (4) a similarity measure between child nodes and a corresponding threshold is used to identify child nodes that are grouped as sibling nodes under an intermediate node, wherein the similarity measure measures a similarity with respect to the corresponding transaction sets of the child nodes.

* * * * *